(12) United States Patent
Oda

(10) Patent No.: US 8,004,552 B2
(45) Date of Patent: Aug. 23, 2011

(54) OPTICAL SCANNING DEVICE AND IMAGE FORMING APPARATUS

(75) Inventor: Ayumu Oda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 99 days.

(21) Appl. No.: 12/487,914

(22) Filed: Jun. 19, 2009

(65) Prior Publication Data

US 2009/0324292 A1 Dec. 31, 2009

(30) Foreign Application Priority Data

Jun. 27, 2008 (JP) .................. 2008-168523
Jun. 27, 2008 (JP) .................. 2008-168528

(51) Int. Cl.
*B41J 15/14* (2006.01)
*B41J 27/00* (2006.01)

(52) U.S. Cl. ........................ 347/242; 347/257

(58) Field of Classification Search .................. 347/230, 347/241–245, 256–261
See application file for complete search history.

(56) References Cited

U.S. PATENT DOCUMENTS

| 6,665,103 | B2 * | 12/2003 | Ishihara | .................. 359/207.1 |
| 2002/0080458 | A1 | 6/2002 | Ishihara | |

FOREIGN PATENT DOCUMENTS

| JP | 1-152406 | A | | 6/1989 |
| JP | 3-168715 | A | | 7/1991 |
| JP | 9-329755 | A | | 12/1997 |
| JP | 10-68902 | A | | 3/1998 |
| JP | 11-174360 | A | | 7/1999 |
| JP | 11-190822 | A | | 7/1999 |
| JP | 2001-100135 | A | | 4/2001 |
| JP | 2001-324692 | A | | 11/2001 |
| JP | 2001324692 | A | * | 11/2001 |
| JP | 2002-189185 | A | | 7/2002 |
| JP | 2003-15070 | A | | 1/2003 |
| JP | 2003-262815 | A | | 9/2003 |
| JP | 2006-189882 | A | | 7/2006 |

* cited by examiner

*Primary Examiner* — Hai C Pham
(74) *Attorney, Agent, or Firm* — Birch, Stewart, Kolasch & Birch, LLP

(57) ABSTRACT

In an optical scanning device having a lens within a housing, the attachment of the lens to the housing is facilitated. The occurrence of lens distortion and warpage is prevented when the lens is formed by an injection molding apparatus. The lens is a long lens elongated in the main scanning direction for a photoreceptor and has support ends formed at both ends of outside of the lens effective area in the longitudinal direction, and one of the support ends formed at both the ends has a first projection that projects from a side surface in a thickness direction of the lens. The lens is positioned and equipped in the longitude direction of the lens relative to the housing supporting the lens with the first projection in the optical scanning device.

15 Claims, 16 Drawing Sheets

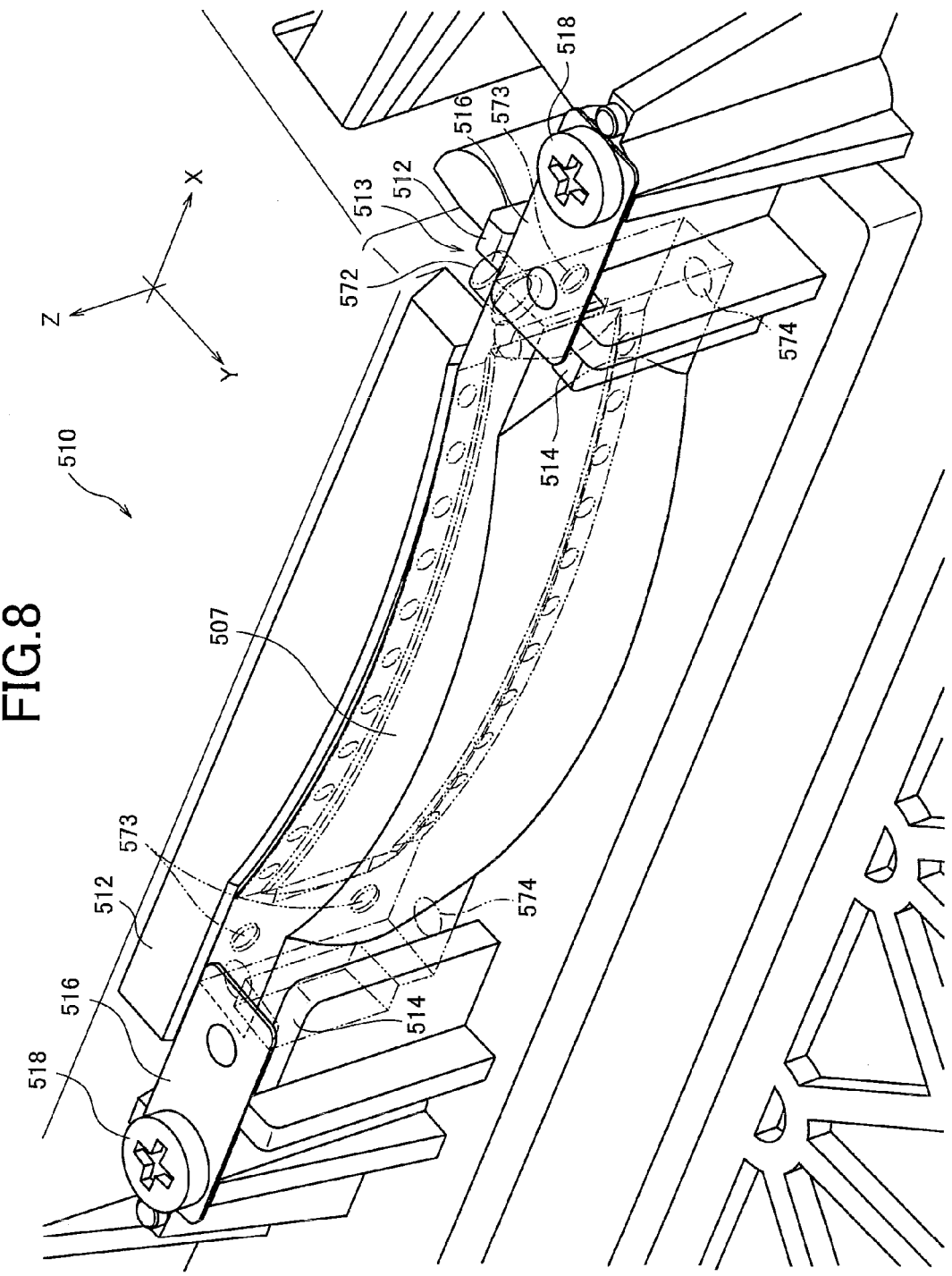

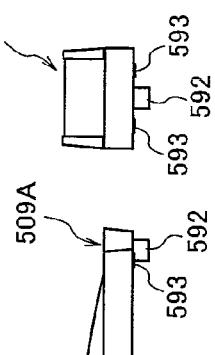
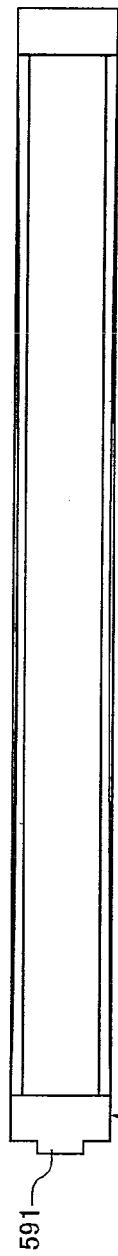
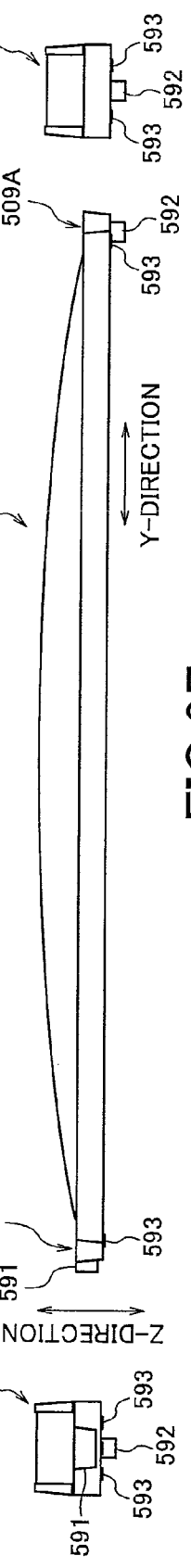
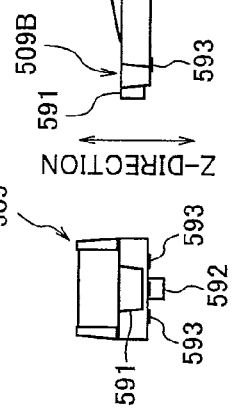
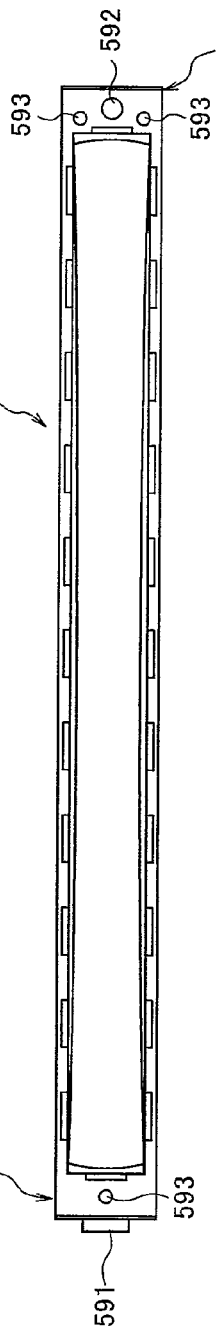
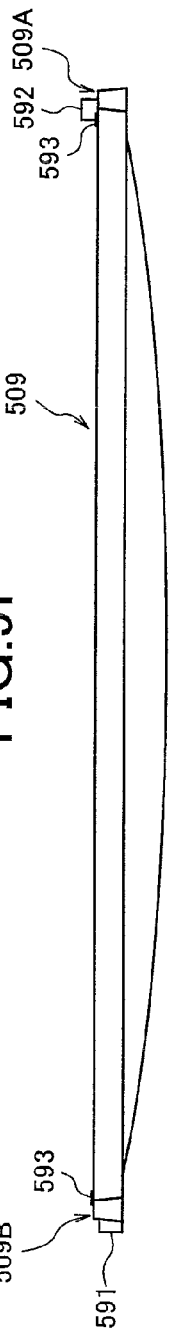

OPTICAL SCANNING DEVICE AND IMAGE FORMING APPARATUS

CROSS-NOTING PARAGRAPH

This non-provisional application claims priority under U.S.C. §119(a) on Patent Application No. 2008-168523 filed in JAPAN on Jun. 27, 2008 and Patent Application No. 2008-168528 filed in JAPAN on Jun. 27, 2008, the entire contents of which are hereby incorporated herein by reference.

FIELD OF THE INVENTION

The present invention relates to an optical scanning device applied to an image forming apparatus such as a copier, a printer, and a facsimile and to an image forming apparatus including the optical scanning device.

BACKGROUND OF THE INVENTION

In order to obtain a desired image an image forming apparatus such as a multi-functional peripheral charges a photoreceptor with a charging device and uses an optical scanning device to scan the photoreceptor with a light beam in accordance with image information to form an electrostatic latent image on the photoreceptor. The optical scanning device of the image forming apparatus has in its housing various lenses such as imaging lenses for focusing light on a photoreceptor from a light source emitting the light beam and various mirrors guiding the light beam to a predetermined path. Such imaging lenses making up the image forming apparatus may be acquired by the injection molding of a resin material. The imaging lenses include a long lens elongated in the main scanning direction.

Some long lenses must be positioned in a housing along with a light source, etc., to scan the photoreceptor with a light beam having desired shape/size.

Japanese Laid-Open Patent Publication No. 11-174360 discloses that when a long lens made of a resin is fixed to an optical box of an optical scanning device, positioning projections provided on the lens in the center in the longitudinal direction is engaged between two reference pins provided in the optical box to position the lens in the longitudinal direction.

Other long lenses are positioned in a housing and rotated and adjusted when used such that the long axis (longitudinal) direction thereof becomes parallel to the axis direction of a photoreceptor drum. The positioning/rotation adjustment is performed as above because the scanning positions are the same for light F scanning the near side in the axis direction and light R scanning the far side in the same direction as shown in FIG. 16A if the longitudinal direction of a long lens 1001 is parallel to the axis direction of a photoreceptor drum 1002, while the scanning positions are differentiated for the light F and the light R as shown in FIG. 16B if not parallel. If the long lens is tilted and the longitudinal direction thereof is not parallel to the axis direction of the photoreceptor drum, the optical scanning line is tilted on the image surface of the photoreceptor drum.

For the tilt adjustment of the optical scanning line on the image surface, the optical scanning device disclosed in Japanese Laid-Open Patent Publication No. 11-174360 is configured as follows. The device includes a long plastic lens having a projection formed on the bottom surface at the center portion in the longitudinal direction and supported by a V-shaped groove of the housing, and two top-surface points at both the ends in the longitudinal direction of the long plastic lens are applied to adjustment screws provided on the housing and supported by pressure. The tilt of the scanning line is corrected by loosening one of the adjustment screws and tightening the other adjustment screw, etc., to rotate and tilt the long plastic lens using the projection at the center portion as the supporting point.

However, if the positioning projection is provided in the center of the long lens as in Japanese Laid-Open Patent Publication No. 11-174360, when the lens is formed by an injection molding apparatus, a flow of a molding resin is disturbed, resulting in distortion or warpage of the imaging lens. In this case, if an optical scanning device including the lens is used in an image forming apparatus, images are distorted and image quality deteriorates.

It is desirable from a viewpoint of assembly cost that the lens is easily attached to the housing of the optical scanning device.

Since the tilt adjustment is performed with two adjustment screws at both the ends of the lens in the optical scanning device disclosed in Japanese Laid-Open Patent Publication No. 11-174360, when one end of the lens is adjusted and subsequently the opposite side is adjusted, the adjustment may not be achieved and the adjustment must be performed again although it is thought that one side is already adjusted and it is problematic that the adjustment is not easy.

SUMMARY OF THE INVENTION

It is an object of the present invention to provide an optical scanning device having a lens within a housing, facilitating the attachment of the lens to the housing and the tilt adjustment of the lens, having a configuration not disturbing the fluidity of a resin forming a lens surface when the lens is formed by an injection molding apparatus, and capable of preventing the occurrence of distortion and warpage of the lens, and an image forming apparatus including the optical scanning device.

Another object of the present invention is to provide an optical scanning device scanning a photoreceptor with a light beam from a light source through at least lenses, the lenses including a long lens elongated in the main scanning direction for the photoreceptor, at least one of the lenses including support ends formed at both ends of outside of the lens effective area in the longitudinal direction of the lens, one of the support ends formed at both the ends including a first projection that projects from a side surface in the incoming or outgoing direction of the beam for the lens, the first projection positioning the lens in the longitudinal direction relative to a housing supporting the lens.

Another object of the present invention is to provide the optical scanning device, wherein the housing has a pair of concave places retaining both the ends of the lens and facing each other, wherein the concave places has upper opening portions allowing the support ends of the lens to be inserted, lateral opening portions opposed to each other to receive the support ends of the inserted lens, and one of opposed side walls forming the concave places with a groove engaging with the first projection, and wherein the lens is inserted from the upper opening portions of the concave places and positioned and equipped in the longitude direction of the lens relative to the housing with the first projection engaged in the groove.

Another object of the present invention is to provide the optical scanning device, wherein the lens has a second projection shorter than the first projection on a side surface provided with the first projection of the support ends at both the ends and is positioned and equipped in the incoming or outgoing direction of the beam for the lens relative to the housing when the second projection contacts with one of the opposed side walls forming the concave places.

Another object of the present invention is to provide the optical scanning device, wherein the second projections are provided, one on the support end provided with the first projection in front of the first projection in the lens insertion direction and two on the support end opposite to the support end provided with the first projection in an arrangement along the lens insertion direction.

Another object of the present invention is to provide the optical scanning device, wherein the support ends at both the ends of the lens are inserted into the concave places and wherein the support end provided with the first projection is bonded and fixed at the bottom to the bottom of the concave place.

Another object of the present invention is to provide the optical scanning device, wherein the lens is injection-molded with the use of a metal mold provided with a gate correspondingly to the support end opposite to the support end provided with the first projection of the lens.

Another object of the present invention is to provide the optical scanning device, wherein the first projection has a cylindrical shape.

Another object of the present invention is to provide the optical scanning device, wherein the concave places are integrally formed in the housing.

Another object of the present invention is to provide an image forming apparatus comprising the optical scanning device.

Another object of the present invention is to provide an optical scanning device scanning a photoreceptor with a light beam from a light source through at least lenses, the lenses including a long lens elongated in the main scanning direction for the photoreceptor, at least one of the lenses including support ends formed at both ends of outside of the lens effective area in the longitudinal direction of the lens, one of the support ends formed at both the ends including a first projection projecting from a side surface in the incoming or outgoing direction of the beam for the lens and acting as a rotation axis of the lens, a housing supporting the lens including attachment portions on both sides for the support ends at both the ends of the lens, the attachment portion on one side having a shaft support portion allowing the first projection of the lens to be inserted to pivotally support the projection, the support end opposite to the side provided with the first projection of the lens being attached rotatably around the first projection to the attachment portion on the other side of the housing.

Another object of the present invention is to provide the optical scanning device, wherein the housing includes a rotation mechanism causing the support end on the opposite side of the lens to rotate, wherein the rotation mechanism has an adjustment screw turned around and inserted into the housing, a cam member operated by the rotation of the adjustment screw to move in contact with one side of the support end on the opposite side of the lens, and a resilient member that presses the other side of the support end on the opposite side of the lens, and wherein the lens is attached with the support end on the opposite side of the lens allowed to rotate due to the rotation of the adjustment screw.

Another object of the present invention is to provide the optical scanning device, wherein the lens has a second projection shorter than the first projection on a side surface provided with the first projection of the support ends at both the ends and is positioned in the incoming or outgoing direction of the beam for the lens relative to the housing when the second projection contacts with the bottom of the lens attachment portion.

Another object of the present invention is to provide the optical scanning device, wherein the second projections are provided, two on the support end provided with the first projection and one on the support end of the opposite side.

Another object of the present invention is to provide the optical scanning device, wherein the lens is injection-molded with the use of a metal mold provided with a gate correspondingly to the opposite support end of the lens.

Another object of the present invention is to provide an image forming apparatus comprising the optical scanning device.

Another object of the present invention is to provide the image forming apparatus, wherein the image forming apparatus has a color image forming function and the lens for each color within the housing.

BRIEF DESCRIPTION OF THE DRAWINGS

FIG. 8 is a front perspective view of the first fθ lens attachment portion of the housing with the first fθ lens attached;

FIGS. 9A to 9F are diagrams of an exemplary configuration of a second fθ lens;

PREFERRED EMBODIMENTS OF THE INVENTION

Figure 1:
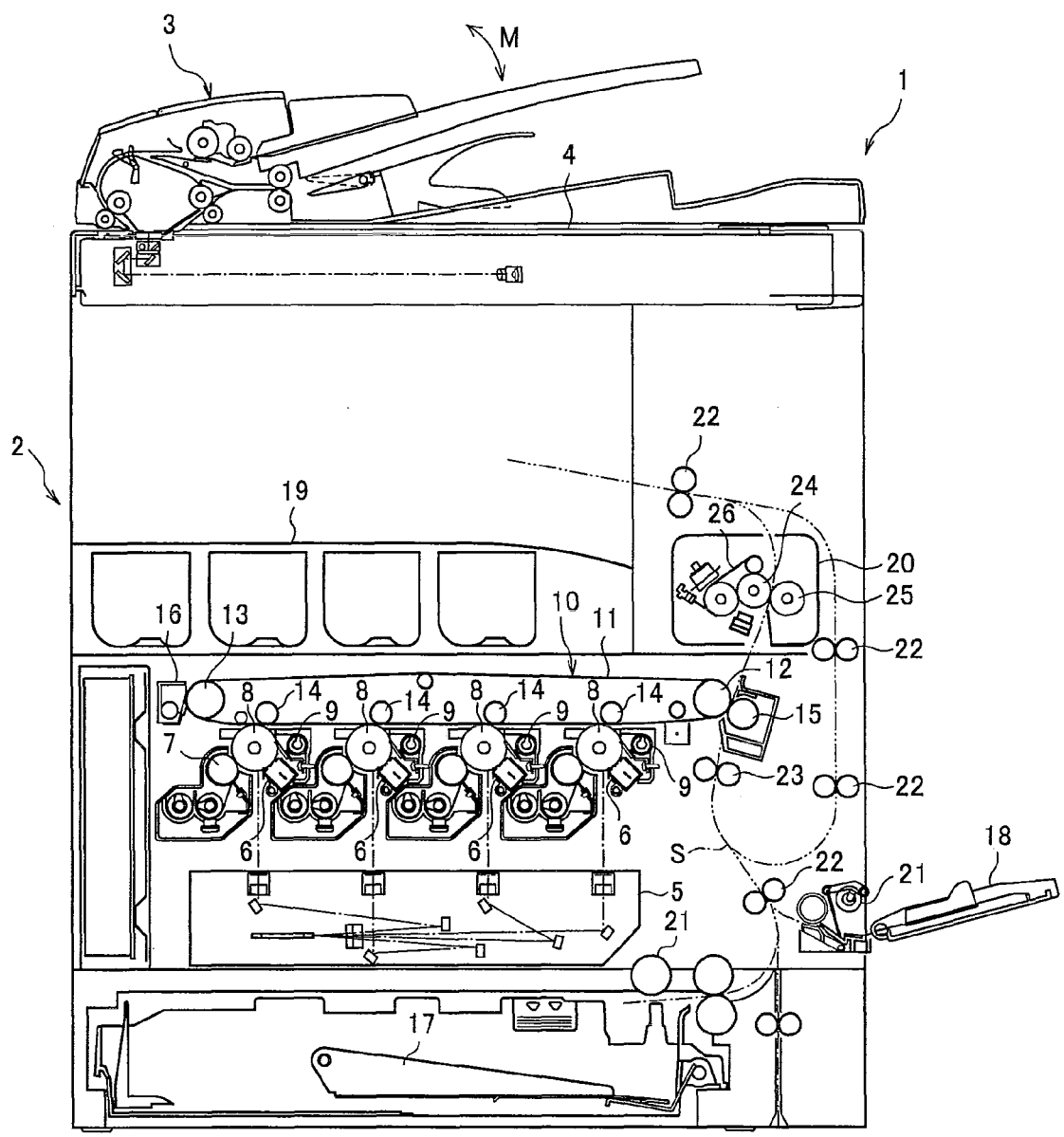
FIG. 1 is a cross-section diagram of an exemplary configuration of an image forming apparatus including an optical scanning device of the present invention.

FIG. 1 is a cross-section diagram of an exemplary configuration of an image forming apparatus including an optical scanning device of the present invention. An image forming apparatus 1 forms a multicolor or monochrome image on a predetermined sheet (recording paper sheet) depending on image data such as image data transmitted from the outside and is made up of an apparatus main body 2 and an automatic document processing apparatus 3.

The automatic document processing apparatus 3 automatically feeds a document onto a document platform 4 on the upper side of the apparatus main body 2. The automatic document processing apparatus 3 is configured to be rotatable in directions of an arrow M, and a document can manually be placed while the upper side of the document platform 4 is opened.

The apparatus main body 2 has an exposure unit 5 described later corresponding to the optical scanning device of the present invention.

The image data handled in the image forming apparatus corresponds to a color image using colors of black (K), cyan (C), magenta (M), and yellow (Y). Therefore, four sets of charging devices 6, development devices 7, photoreceptor drums (hereinafter, photoreceptors) 8, and cleaner units 9 are provided such that four types of latent images are formed correspondingly to four colors, and respective sets are set to K, C, M, and Y.

The exposure unit 5 has a function of exposing the photoreceptor 8 charged by the charging device 6 with a light beam correspondingly to the input image data to form an electrostatic latent image corresponding to the image data on the surface of the photoreceptor 8. The configuration of the exposure unit 5 will specifically be described later.

The charging device 6 is a charging means for uniformly charging the surface of the photoconductor 8 to a predetermined electric potential. The developing device 7 develops the electrostatic latent images formed on the respective photoreceptors 8 with toners of four colors (Y, M, C, and K). The cleaner unit 9 removes and collects the toners remaining on the surface of the photoreceptor 8 after the development and the image transfer.

An intermediate transfer belt unit 10 disposed above the photoreceptors 8 has a function of forming a color toner image (multicolor toner image) by sequentially transferring and overlapping the color toner images formed on the photoreceptors 8 onto the intermediate transfer belt 11 provided in contact with the photoreceptors 8. The intermediate transfer belt 11 is stretched and driven by an intermediate transfer belt driving roller 12, an intermediate transfer belt driven roller 13, and an intermediate transfer rollers 14. The transfer of the toner images from the photoreceptors 8 to the intermediate transfer belt 11 is performed through the intermediate transfer rollers 14 in contact with the back side of the intermediate transfer belt 11. To the intermediate transfer rollers 14, a high-voltage transfer bias (high voltage with the opposite polarity (+) to the charging polarity (−) of the toner) is applied to transfer the toner images.

The electrostatic images are developed on the photoreceptors 8 in accordance with the hues as described above and are laminated on the intermediate transfer belt 11. The laminated image information is transferred through the rotation of the intermediate transfer belt 11 onto a paper sheet by a transfer roller 15 disposed at a contact position between the paper sheet and the intermediate transfer belt 11. The intermediate transfer belt 11 and the transfer roller 15 are pressed against each other at a predetermined nip and a voltage (high voltage with the opposite polarity (+) to the charging polarity (−) of the toner) is applied to the transfer roller 15 to transfer the toner to the paper sheet. An intermediate transfer belt cleaning unit 16 removes and collects the toner adhering to the intermediate transfer belt 11 due to the contact with the photoreceptors 8 or the toner remaining on the intermediate transfer belt 11 that is not transferred onto the paper sheet through the transfer roller 15 as above.

A paper feed cassette 17 is a tray for storing sheets used for forming images and is provided on the underside of the exposure unit 5 in the apparatus main body 2. The sheets may also be placed on a manual paper feed cassette 18. A paper discharge tray 19 provided on the upper side of the apparatus main body 2 is a tray for accumulating the printed sheets face-down.

The apparatus main body 2 is provided with a paper carrying path S in an approximate vertical shape for sending the sheets in the paper feeding cassette 17 and the manual paper feed cassette 18 to the paper discharge tray 19 via the transfer roller 15 and a fixing unit 20. Pickup rollers 21, a plurality of carrying rollers 22, a resist roller 23, the transfer roller 15, the fixing unit 20, etc. are disposed near the paper carrying path S from the paper feeding cassette 17 and the manual paper feed cassette 18 to the paper discharge tray 19.

The carrying rollers 22 are a plurality of small rollers for facilitating/aiding the carriage of the sheets and are provided along the paper carrying path S. The pickup roller 21 is provided near the end of the paper feeding cassette 17 and the manual paper feed cassette 18 and picks up the sheets one-by-one from the paper feeding cassette 17 and the manual paper feed cassette 18 to supply the sheets to the paper carrying path S.

The resist roller 23 temporarily holds the sheet carried through the paper carrying path S. The resist roller 23 has a function of carrying the sheet to the transfer roller 15 at the timing matching the leading end of the toner image on the photoreceptor 8 with the leading end of the sheet.

The fixing unit 20 has a function of performing the thermocompression of the toner against the sheet with a heat roller 24 and a pressure roller 25 to melt/mix/press the multicolor toner image transferred to the sheet to thermally fix the image onto the sheet. The fixing unit 20 is provided with an external heating belt 26 for heating the heat roller 24 from the outside. After the sheet passes through the fixing unit 20 and the unfixed toner is thermally melted/fixed, the sheet, for example, passes through the carrying rollers 22 disposed on the paper carrying path S on the downstream side and is discharged on the paper discharge tray 19.

Figure 2:
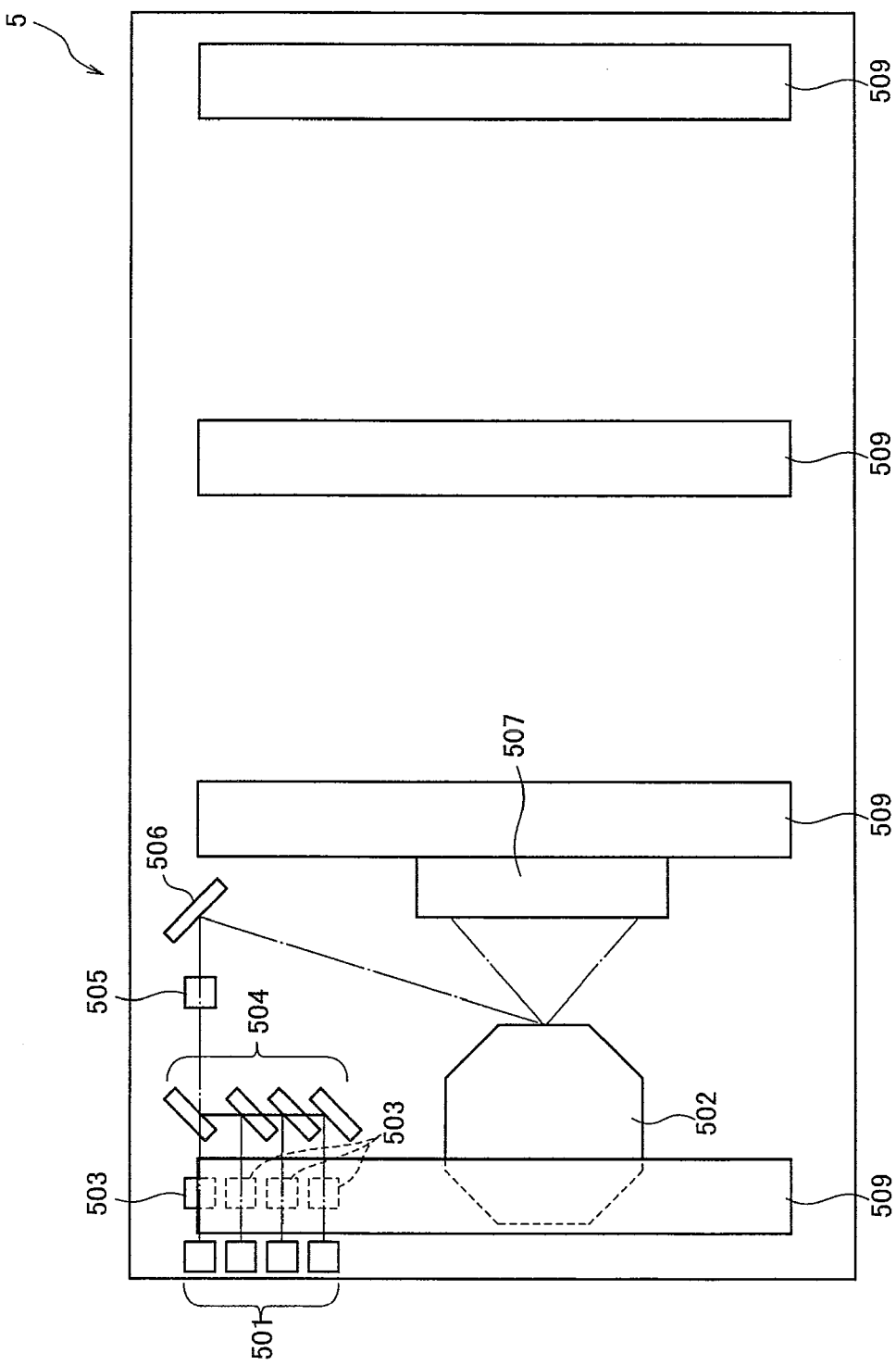
FIG. 2 is a schematic diagram of a relevant part inside a housing when an exposure unit of FIG. 1 is viewed from the top.
Figure 3:
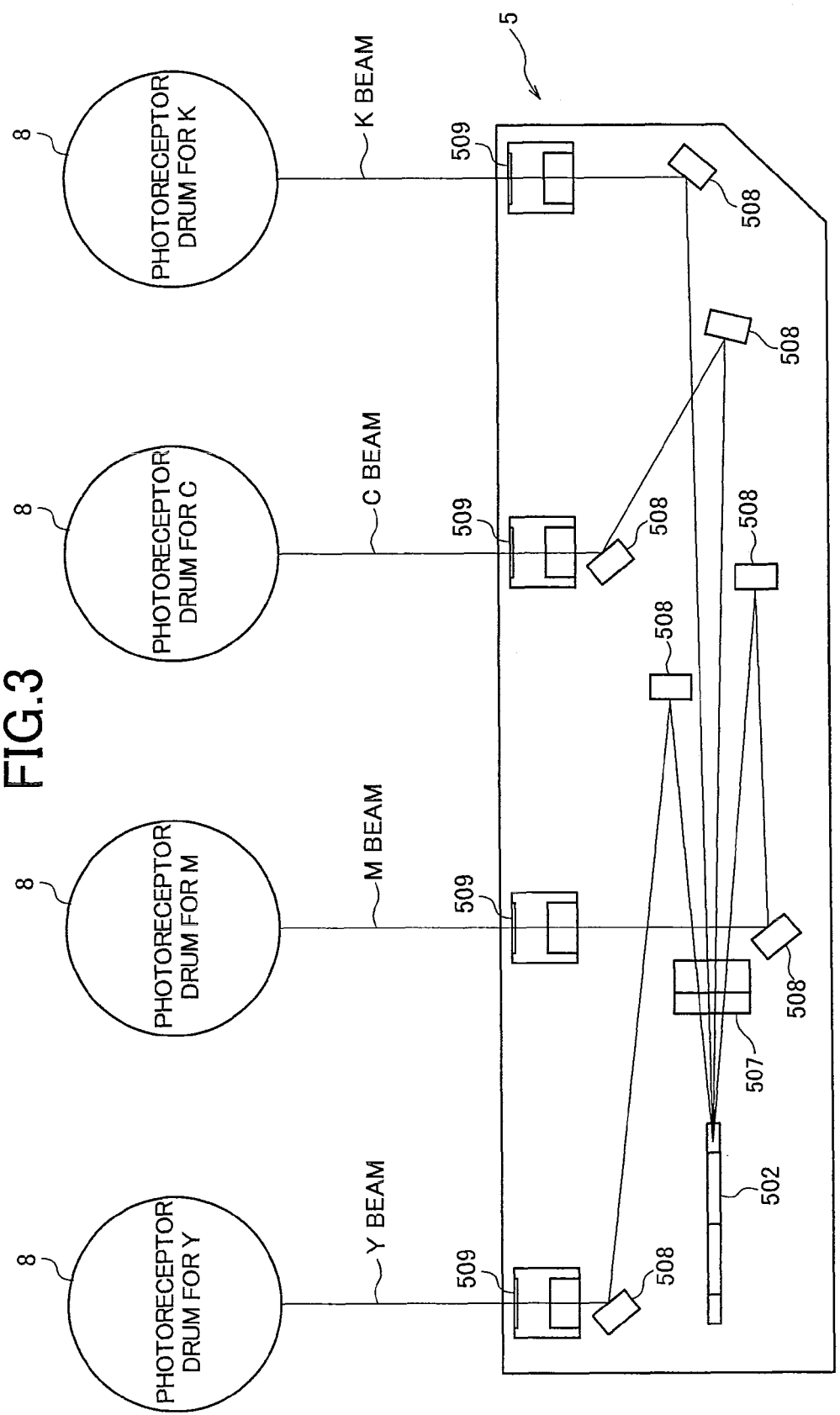
FIG. 3 is a schematic diagram of a relevant part inside the housing with photoreceptors when the exposure unit of FIG. 1 is viewed from the side.
Figure 4:
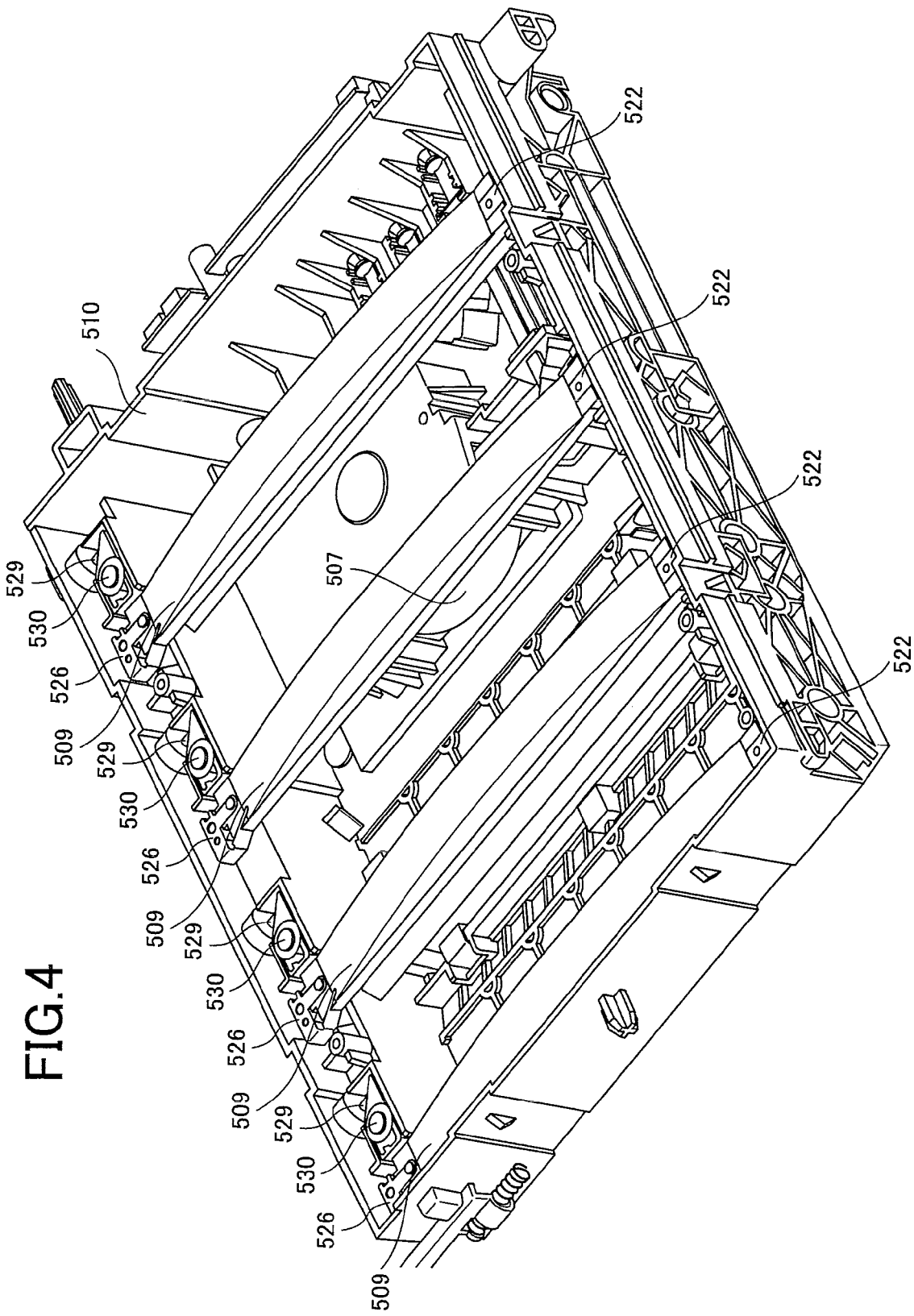
FIG. 4 is a perspective view of a relevant part of the exposure unit of FIG. 1 with a top cover removed.

An exemplary configuration of the optical scanning device (i.e., the exposure unit 5) will then be described in detail with reference to FIGS. 2 to 4. FIGS. 2 and 3 schematically depict a relevant part inside a housing when the exposure unit 5 of FIG. 1 is viewed from the top and the side, respectively. FIG. 3 also depicts the unit with the photoreceptors 8. FIG. 4 is a perspective view of a relevant part of the exposure unit 5 with a top cover removed.

The exposure unit 5 is an optical scanning device that reflects a light beam emitted from four semiconductor lasers of FIG. 2 as a beam emitting means to a rotation polygonal mirror 502 having a plurality of reflecting surfaces in the rotation direction (hereinafter, incoming beam) with the reflecting surfaces to scan the photoreceptors 8 of FIG. 3 with a light beam formed by the reflection (hereinafter, outgoing beam).

Various optical components are disposed in a light path from the semiconductor lasers 501 to the rotation polygonal mirror 502 (hereinafter, incoming beam light path) and a light path from the rotation polygonal mirror 502 to the photoreceptors 8 (hereinafter, outgoing beam light path).

The optical components disposed in the incoming beam light path are referred to as an incoming optical system and the optical components disposed in the outgoing beam light path are referred to as an outgoing optical system.

The incoming optical system guides the incoming beam emitted from the semiconductor lasers 501 to the rotation polygonal mirror 502. Four collimator lenses 503, four first reflecting mirrors 504, a cylindrical lens 505, and a second reflecting mirror 506 are arranged in order from the four semiconductor lasers 501 to the rotation polygonal mirror 502 in the incoming beam light path.

Each of the collimator lenses 503 converts the light beam emitted from the corresponding semiconductor laser 501 into a parallel beam. Each of the first reflecting mirrors 504 reflects the beam emitted from the corresponding collimator lens 503 to make the beam incident on the cylindrical lens 505. The cylindrical lens 505 is disposed to focus the incident light beam onto the photoreceptors 8 in the sub-scanning direction. The second reflecting mirror 506 reflects four beams emitted from the cylindrical lens 505 to make the beams incident on the rotation polygonal mirror 502. The cylindrical lens 505 almost focuses the respective light beams incident on the lens 505 as the parallel beams onto the surface of the reflecting surface of the rotation polygonal mirror 502 in the sub-scanning direction and directly emits the incident light beams as parallel light to make the beam incident on the reflecting surface the rotation polygonal mirror 502 in the main scanning direction.

The incoming beam is applied to the center zone in the height direction of the reflecting surface of the rotation polygonal mirror 502 as above.

On the other hand, the outgoing optical system guides the outgoing beam reflected by the reflecting surface of the rotation polygonal mirror 502 from the rotation polygonal mirror 502 to the photoreceptors 8 and acts on the beam such that the beam forms a beam spot with a predetermined size and scans the photoreceptors 8 at constant velocity when the beam is applied to the photoreceptors 8.

A first fθ lens 507, outgoing return mirrors 508, and second fθ lenses 509 are arranged in order from the rotation polygonal mirror 502 to the photoreceptors 8 in the outgoing beam light path.

The first fθ lens 507 focuses the light beams of parallel light emitted from the rotation polygonal mirror 502 to form a predetermined beam diameter on the surfaces of the photoreceptors 8 in the main scanning direction and converts the light beams of diffuse light emitted from the rotation polygonal mirror 502 into parallel light in the sub-scanning direction. The first fθ lens 507 has a function of converting the light beam moving at constant angular velocity in the main scanning direction due to the constant angular velocity movement of the rotation polygonal mirror 502 into the light beam moving at constant linear velocity on the scanning line of the photoreceptor 8.

The outgoing return mirrors 508 reflect the light beams split by the rotation polygonal mirror 502 and passing through the first fθ lens 507 to make the light beams incident on the second fθ lenses 509. The second fθ lenses 509 focuses the incident light beams of parallel light to form a predetermined beam diameter on the photoreceptors 8 in the sub-scanning direction and directly focuses the light beams of convergent light formed by the first fθ lens 507 onto the photoreceptors in the main scanning direction.

The outgoing beam goes to and passes through the first fθ lens 507 to be reflected by the outgoing return mirrors 508 and passes through the second fθ lenses 509 to be guided to the photoreceptors 8 as above.

The outgoing beam reaches the photoreceptor 8 through different light paths depending on a position of the reflecting surface of the rotation polygonal mirror 502 in the rotation direction. In a method of scanning the photoreceptor 8 by the outgoing beam, while the outgoing beam periodically scans the main scanning line, the different positions of the photoreceptor 8 are optically scanned at certain time intervals since the photoreceptor 8 rotates.

The first fθ lens 507 and the second fθ lens 509 making up the above optical system are housed in a housing 510 as shown in FIG. 4. A plate spring 522, a holding member 526, an adjustment screw 529, a cam member 530, etc., will be described later.

Figure 5A:
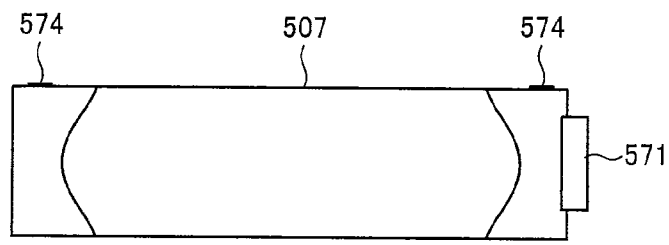
FIGS. 5A to 5F are diagrams of an exemplary configuration of a first fθ lens.
Figures 5B, 5C, 5D:
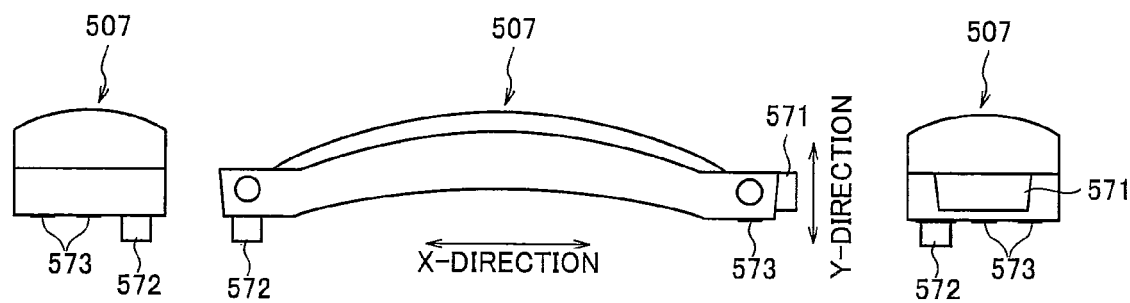
Figure 5E:
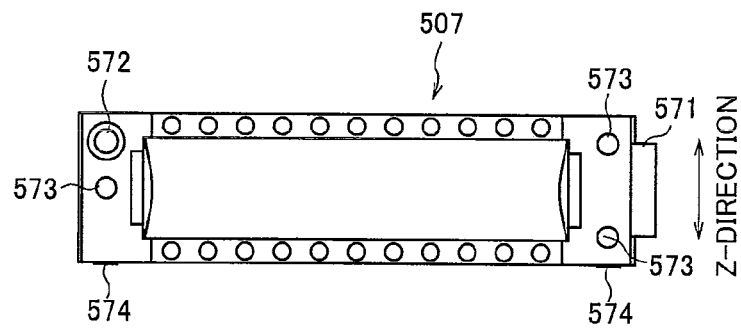
Figure 5F:
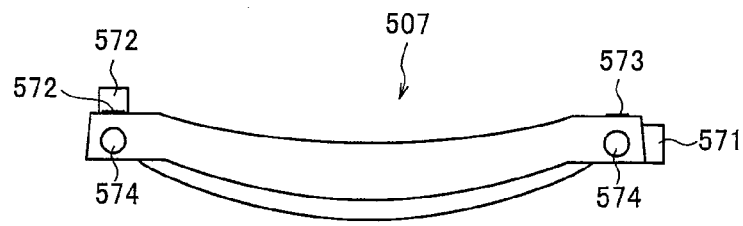

An exemplary configuration of the first fθ lens will be described with reference to FIGS. 5A to 5F. FIG. 5A, FIG. 5B, FIG. 5E, and FIG. 5F depict the states viewed from the incoming surface side, the upper side, the outgoing surface side, and the lower side, respectively, and FIG. 5C and FIG. 5D depict the state viewed from the sides opposite to each other.

The first fθ lens 507 is made of, for example, a polycarbonate resin and has a convex-shaped lens surface projected toward the outgoing surface side. The first fθ lens 507 is a long lens having the longitudinal axis in the main scanning direction.

Both ends of the first fθ lens 507 outside of the lens effective area (the area assuring the performance of the lens function) in the longitudinal direction act as support ends supported by the housing 510 as described later.

Since the first fθ lens 507 is molded by injecting melted polycarbonate from a gate provided in a metal mold into the metal mold, a gate portion 571 corresponding to the gate is provided at one end of the first fθ lens 507 in the longitudinal direction.

The first fθ lens 507 has a first positioning projection (hereinafter, abbreviated to first projection) 572 integrally formed at the end of outside of the lens effective area opposite to the gate portion 571. The first projection 572 is for the purpose of positioning the first fθ lens 507 attached to the housing 510 in the longitudinal direction (X-direction) and is projected toward the light incident side in the thickness direction of the first fθ lens 507 (the incoming direction or the outgoing direction of the beam for the first fθ lens 507, or Y-direction) orthogonal to the longitudinal direction. The fist projection 572 is formed in a cylindrical shape with a height of 3 mm and a diameter of 3 mm, for example.

Normally, in the case of a long (imaging) lens, to reduce the lens distortion and warpage as much as possible in view of optical performance, when the injection molding of the lens is performed with the use of a flowable material, a gate portion is formed at the end of the lens in consideration of the fluidity of the resin. In such a case that the gate portion 571 is provided at the end of the first fθ lens 507, if a large lib or projection is provided at the center portion of the first fθ lens 507, the fluidity and the internal pressure balance of the resin deteriorate. In the case of the first fθ lens 507 of the present invention, the first projection 572 is provided at the end opposite to the gate portion 571 to avoid the disturbance of the fluidity of the resin forming the lens surface and the occurrence of distortion and warpage may be prevented in the first fθ lens 507. Therefore, an image forming apparatus equipped with an optical scanning device using the first fθ lens 507 may prevent the image quality deterioration such as distortion of image.

On flat portions of the incoming surface at the ends of outside of the lens effective area in the longitudinal direction of the first fθ lens 507, second positioning projections (hereinafter, abbreviated to second projections) 573 are integrally formed along with the one first projection 572. The second projections 573 are projected in the projection direction of the first projection 572 by a projection length shorter than that of the first projection 572. The second projections 573 are for the purpose of positioning the first fθ lens 507 to the housing 510 in the thickness direction (Y-direction). The second projections 573 are formed in a cylindrical shape with a height of 0.3 mm and a diameter of 2 mm, for example.

The second projections 573 are provided, one near the first projection 572 and two on the flat portion of the incoming surface at the end of outside of the lens effective area on the gate portion side. The three second projections 573 are necessary and sufficient for defining the orientation of the incoming surface and the outgoing surface of the (imaging) lens and are disposed, two at one end and one at the other end in the longitudinal direction of the lens. The positions of the three second projections 573 achieve good stability at the time of the attachment when arranged to form an isosceles triangle. It is preferable to arrange the first projection 572 and the one second projection 573 on the flat portion on line in the direction of attachment of the first fθ lens 507 to the housing and also arrange the other two second projections 573 similarly. The reason why these arrangements are preferable will be described later.

Third positioning projections (hereinafter, abbreviated to third projections) 574 are integrally formed on the lower side at both the ends of outside of the lens effective area in the longitudinal direction of the first fθ lens 507. The third projections 574 are for the purpose of positioning the first fθ lens 507 attached to the housing 510 in the vertical direction (Z-direction) and is formed in a cylindrical shape with a height of 0.3 mm and a diameter of 2 mm, for example.

As above, the first projection 572 is formed at the end of outside of the lens effective area opposite to the gate portion 571 in the longitudinal direction of the first fθ lens 507 to avoid the disturbance of the fluidity of the resin forming the lens surface when the first fθ lens 507 is molded by a molding apparatus, and the occurrence of distortion and warpage may be prevented in (the lens surface of) the first fθ lens 507.

Although the second projections 573 and the third projection 574 are formed on the side of the gate portion 571, since the formation area thereof is out of the lens effective area in the longitudinal direction and the heights thereof are low, the fluidity of the resin forming the first fθ lens 507 is not disturbed.

As described above, the first fθ lens 507 ensures the accuracy of positioning relative to the housing 510 by including the reference positioning projections in the longitudinal direction, the projection direction of the lens surface (the lens thickness direction), and the direction orthogonal to these directions (the lens width direction) for the fixation to the housing 510 of the optical scanning device.

Figure 6:
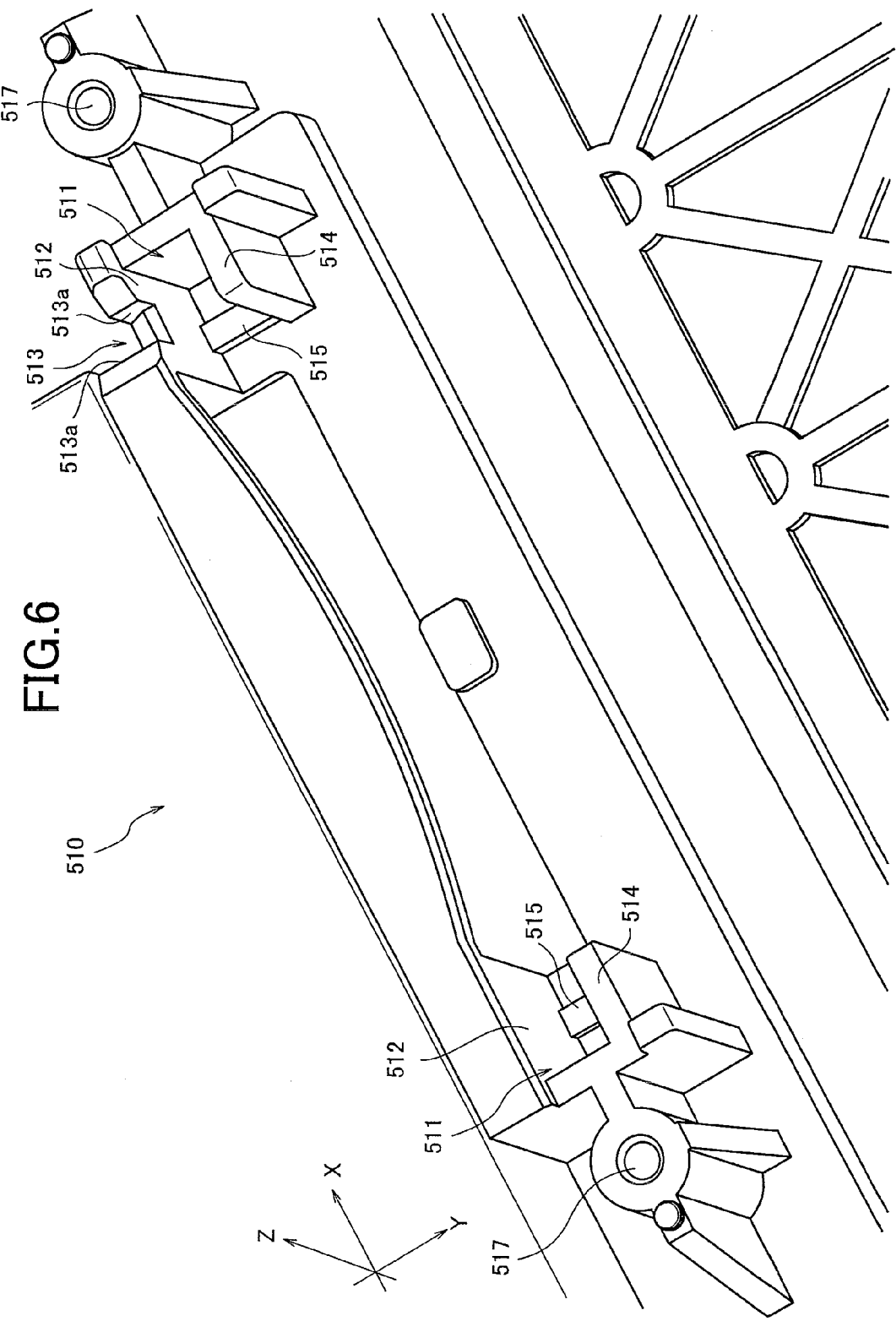
FIG. 6 is a rear perspective view of a first fθ lens attachment portion of the housing before attaching the first fθ lens.
Figure 7:
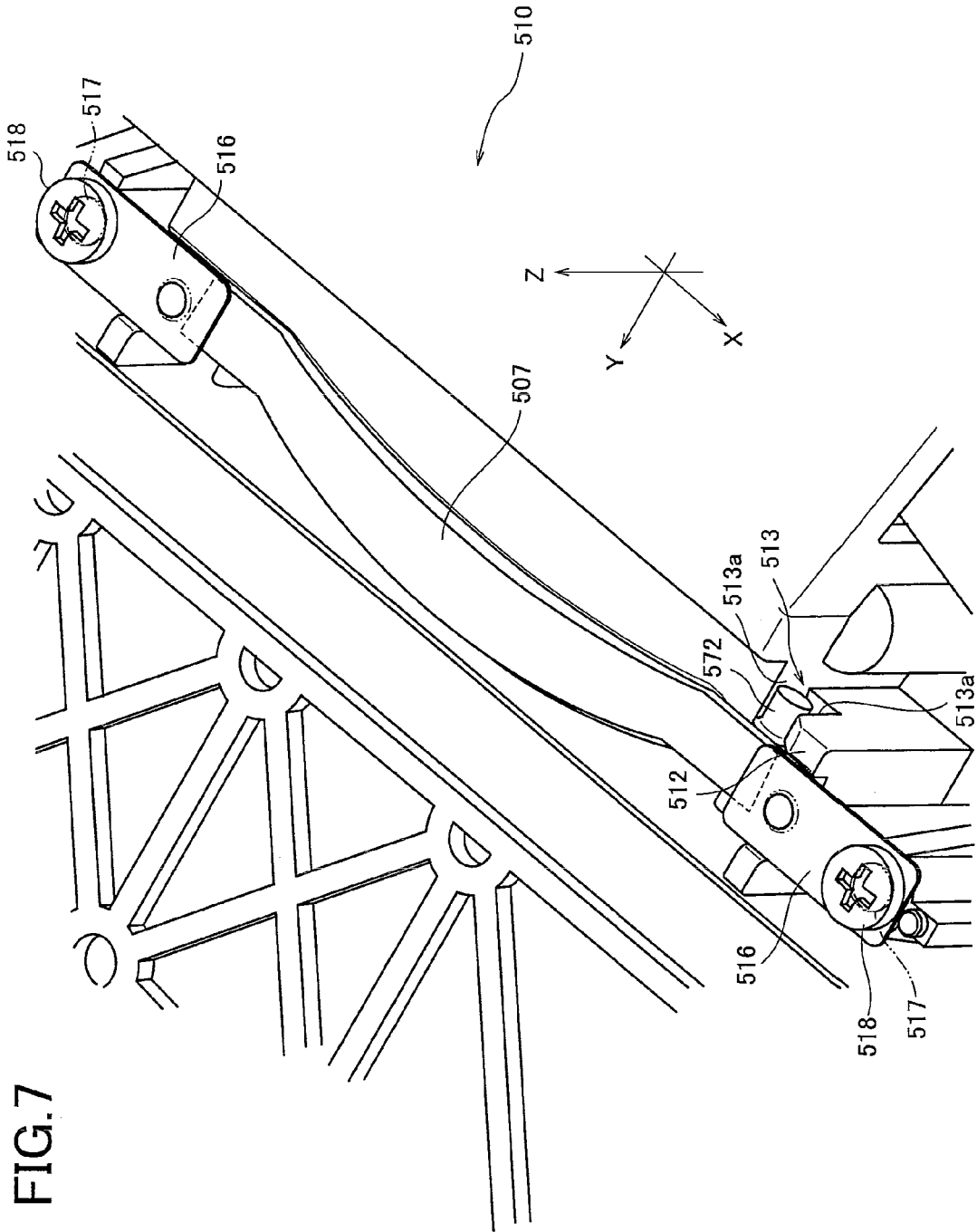
FIG. 7 is a rear perspective view of the first fθ lens attachment portion of the housing with the first fθ lens attached.

The housing positioned and equipped with the first fθ lens in the optical scanning device will be described with reference to FIGS. 6 to 8. FIG. 6 is a rear perspective view of the first fθ lens attachment portion of the housing before attaching the first fθ lens. FIGS. 7 and 8 are rear and front perspective views of the lens attachment portion of the housing with the first fθ lens attached.

The housing 510 has a shape corresponding to the first fθ lens 507, has a lens attachment portion opened in at least one direction, and may be acquired by the injection molding of a resin material, for example. A lens attachment portion included in the housing 510 of the example in the figures is opened in the upper direction. The lens attachment portion is made up of two concave portions (concave places) 511 in a square U-shape (i.e., a form with openings in the upper and lateral directions) viewed from the upper direction (Z-direction) and the lateral openings of the concave portions 511 are opposed to each other. The first fθ lens 507 is attached to the housing 510 by inserting and receiving both the ends (the support ends) in the longitudinal direction of the first fθ lens 507 from the opening direction (the upper direction) of the housing 510 into the concave portions 511.

In one of the concave portions 511, a concave-shaped groove 513 extending in the direction orthogonal to the vertical direction (Z-direction) is integrally formed on the upper side of one of the side walls opposite to each other (a rear side wall 512 in this example). When the first fθ lens 507 is inserted from the upper direction, the first projection 572 of the first fθ lens 507 is received in the groove 513 and engaged with (fitted in) the groove 513 and the first fθ lens 507 is positioned to the housing in the longitudinal direction (X-direction).

In the housing 510, the first fθ lens 507 contacts a side surface 513a of the groove 513 of the housing 510 at the first projection 572 and, therefore, is prevented from moving in the X-direction by a predetermined value or more. The width of the groove (positioning groove) 513 is approximately the same as the width (the diameter of the cylindrical portion) of the first projection 572 of the first fθ lens 507 for the above positioning and is 3 mm in this example and tolerance is +0.05 to 0. The tolerance of the first projection 572 of the first fθ lens 507 is −0.02 to −0.07.

The housing 510 includes one of wall surfaces opposite to each other forming the concave portion 511 (the front surface of the rear side wall 512 of the concave portion 511 in this example) acting as a Y-direction reference surface for the positioning of the first fθ lens 507 in the lens surface projection direction (Y-direction) and the wall surface comes into contact with the second projections 573 of the attached first fθ lens 507. Since the front surface of the one side wall 512 of the concave portion 511 contacts the second projections 573 of the first fθ lens 507 and the rear surface of the other side wall 514 contacts the flat surface at the end on the outgoing light side of the first fθ lens 507, the first fθ lens 507 is prevented from moving in the thickness direction (Y-direction) by a predetermined value or more. In such a case that a gap between the walls 512 and 514 on the front and rear sides of the concave portion 511 is not sufficient when considering the expansion degree of the first fθ lens 507 or the first fθ lens 507 cannot be inserted into the gap because the first fθ lens 507 is thick, the second projections 573 of the first fθ lens 507 may be ground down for fine adjustment on the metal mold.

The housing 510 integrally includes pedestal portions contacting with the third projections 574 of the first fθ lens 507 and acting as Z-direction reference surfaces for the positioning of the first fθ lens 507 in the vertical direction (Z-direction). The pedestal portion 515 is formed as a small area. The pedestal portion 515 is formed as a small area because the pedestal portion 515 may easily be ground down on the metal mold to finely adjust the height thereof and to adjust the Z-direction position of the first fθ lens 507 in design.

Since the lens is positioned relative to the housing in all the directions (the lens longitudinal direction, the lens thickness direction, and the lens width direction orthogonal to these directions) only by inserting the first fθ lens 507 from the opening direction of the lens attachment portion of the housing 510 as above, it is very easy to position and attach the lens to the housing in the optical scanning device of the present invention. Since another component or positioning jig is not necessary at the time of the positioning, the assembly cost may be constrained.

When the first fθ lens 507 is attached to the housing 510, for example, two plate springs 516 each having a hole formed at one end may be used to prevent the first fθ lens 507 from dropping off in the Z-direction. In this case, the housing 510 is provided with screw holes 517 for fixing the plate springs 516. The plate springs 516 are disposed on the housing 510 with the holes at one ends of the plate springs 516 located on the screw holes 517 and the other ends of the plate springs 516 located on the side ends of the first fθ lens 507 and are fixed by attaching screws (bolts) 518 on the screw holes 517 to hold both the sides of the first fθ lens 507 through the use of the spring nature of the plate springs 516 and the first fθ lens 507 may be prevented from dropping off in the Z-direction. The plate springs 516 are made of SUS material, etc.

Another method of preventing the drop-off may be performed by applying a UV cure adhesive on the pedestal portions 515 (the Z-direction reference surfaces) of the bottom of the housing 510 on the side of the positioning groove 513 (i.e., the side of the first projection 572 of the first fθ lens 507), attaching the first fθ lens 507, and irradiating ultraviolet to the application portion to completely fix the lens to the housing 510.

The method using the adhesive may reduce the number of components and improve the workability of the assembly to further reduce the cost.

If two locations on the bottom of both ends in the longitudinal direction of the first fθ lens 507 are bonded and fixed or the first fθ lens 507 is bonded and fixed on the side opposite to the first projection side, the first fθ lens 507 is stressed in the longitudinal direction and distorted and a problem occurs in the optical performance due to a difference in linear expansion coefficient between the housing 510 and the first fθ lens 507 in association with the rise in temperature of the optical scanning device. The preferable optical performance may be acquired without stress and distortion of the first fθ lens 507 by bonding the lens on only one side where the first projection 572 is formed as above.

Since the concave-shaped groove 513, the front and rear side walls 512, 514 of the concave portion 511, and the pedestal portion 515 are integrally formed to position the first fθ lens 507 in the X, Y, and Z directions as above, the housing 510 achieves the preferable positioning accuracy for the first fθ lens 507.

The positional relationship between the first projection 572 and the second projections 573 of the first fθ lens 507 will then be examined with reference to FIGS. 5A to 5F again.

First, conversely to the above, it is assumed that the first projection 572 and the two second projections 573 of the first fθ lens 507 are disposed on the same side.

(1) If the three projections 572, 573 are not arranged on a straight line in the direction of attachment of the first fθ lens 507 to the housing (the direction of insertion of the first fθ lens 507 into the housing), the size of the first fθ lens 507 itself becomes larger beyond necessity in the longitudinal direction.

(2) If the three projections 572, 573 are arranged on a straight line in the direction of attachment of the first fθ lens 507 to the housing, if the first projection 572 is disposed between the two second projections 573 so as not to elongate the length in the transverse direction (in the Z-direction) of the lens, it becomes difficult to provide the housing constructed by the molding with a surface applied against the second projection 573 behind the first projection 572 in the attachment direction when the lens is incorporated (attached) from the opening direction of the housing.

It is then assumed that the first projection 572 and the one second projection 573 of the first fθ lens 507 are disposed on the same side with the two second projections 573 disposed on the other side.

(A) If the first projection 572 and the one second projection 573 or the two second projections 573 are not arranged on a straight line in the direction of attachment of the first fθ lens 507 to the housing, the size of the first fθ lens 507 itself becomes larger beyond necessity in the longitudinal direction.

As apparent from this examination, if the first fθ lens 507 is provided with the three second projections 573, it is preferable that one of the second projections 573 is disposed on the side of the first projection 572, that the first projection 572 and one of the second projections 573 are arranged on a straight line, and that the other two second projections 573 are also arranged on a straight line in the direction of the first fθ lens 507. By arranging the projections as above, the orientation of the incoming and outgoing surfaces of the first fθ lens 507 may stably be positioned and the housing 50 may be acquired on molding without problems.

The positioning projections of the first fθ lens are not limited to the cylindrical shape.

Since the optical scanning device made up of the first fθ lens and the housing as above is easily assembled due to the above configuration, if the optical scanning device is applied to a color image forming apparatus attached with and using a plurality of lenses requiring the positioning, the apparatus may easily be assembled in a shorter time than conventional apparatuses.

The attachment configuration of the second fθ lens 509 and the housing 510 will then be described.

FIG. 9A, FIG. 9B, FIG. 9E, and FIG. 9F depict the states of the second fθ lens of FIGS. 3 and 4 viewed from the outgoing surface side, the front side, the incoming surface side, and the rear side, respectively, and FIG. 9C and FIG. 9D depict the state viewed from the sides opposite to each other.

The second fθ lens 509 has a convex-shaped lens surface projected toward the outgoing surface side and is made of, for example, a polycarbonate resin. The second fθ lens 509 is a long lens elongated in the main scanning direction.

Since the second fθ lens 509 is molded by injecting melted polycarbonate from a gate provided in a metal mold into the metal mold, a gate portion 591 corresponding to the gate is formed at one end of the second fθ lens 509 in the longitudinal direction (Y-direction).

The second fθ lens 509 has a first projection 592 integrally formed on the light incident surface side of a support end (first end 509A) outside of the lens effective area (the area assuring the performance of the lens function) opposite to a support end on the side of the gate portion 591 in the longitudinal direction. The first projection 592 acts as a reference of the positioning of the second fθ lens 509 to the housing 510 as well as a rotation axis of the second fθ lens 509. The tilt of the scanning line on the image surface of the photoreceptor 8 may be corrected in the exposure unit 5 by rotating the second fθ lens 509 around the first projection 592 to adjust the tilt.

The first projection 592 is projected toward the light incident side in the thickness direction of the second fθ lens 509 (the incoming direction or the outgoing direction of the beam for the second fθ lens 509, or Z-direction) and is formed in a cylindrical shape with a height of 3 mm and a diameter of 3 mm, for example.

Normally, in the case of a long (imaging) lens, to reduce the lens distortion and warpage as much as possible in view of optical performance, when the injection molding of the lens is performed with the use of a flowable material, a gate portion is formed at the end of the lens in consideration of the fluidity of the resin. In such a case that the gate portion 591 is provided at the end of the second fθ lens 509, if a large lib or projection is provided at the center portion of the second fθ lens 509, the fluidity and the internal pressure balance of the resin deteriorate in the injection molding. In the case of the second fθ lens 509 of the present invention, the first projection 592 is provided at the end opposite to the gate portion 591 to prevent the problem of the fluidity of the resin, etc.

On flat portions of the incoming surface at the ends of outside of the lens effective area in the longitudinal direction of the second fθ lens 509, second projections 593 are integrally formed along with the one first projection 572. The second projections 593 are projected in the projection direction of the first projection 592 by a projection length shorter than that of the first projection 592. The second projections 593 are for the purpose of positioning the second fθ lens 509 to the housing 510 in the thickness direction. The second projections 593 are formed in a cylindrical shape with a height of 0.3 mm and a diameter of 2 mm, for example.

The second projections 593 are provided, two near the first projection 592 at the first end 509A with the first projection 592 formed and one on the flat portion of the incoming surface at the end of outside of the lens effective area on the gate portion 591 side (a second end 509B opposite to the first end 509A). The three second projections 593 are necessary and sufficient for positioning the second fθ lens 509 in the thickness direction when the second fθ lens 509 is attached to the housing 510, and the positional relationship of the three projections achieves good stability at the time of the attachment when two projections are disposed at the first end 509A and one projection is disposed at the second end 509B to form an isosceles triangle. If two of the second projections 593 closer to the first projection 592 are provided and arranged in the width direction of the second fθ lens 509 with the first projection 592 placed therebetween, the size of the second fθ lens 509 may not be enlarged more than necessary.

As above, the first projection 592 is formed at the end of outside of the lens effective area opposite to the gate portion 591 in the longitudinal direction of the second fθ lens 509 to avoid the disturbance of the fluidity of the resin forming the lens surface when the second fθ lens 509 is molded by a molding apparatus, and the occurrence of distortion and warpage may be prevented in (the lens surface of) the second fθ lens 509. Therefore, an image forming apparatus equipped with an optical scanning device using the second fθ lens 509 may prevent the image quality deterioration such as distortion of image.

Although the second projections 593 are formed on the side of the gate portion 591, since the formation area thereof is out of the lens effective area in the longitudinal direction and the heights thereof are low, the fluidity of the resin forming the second fθ lens 509 is not disturbed.

Figure 10:
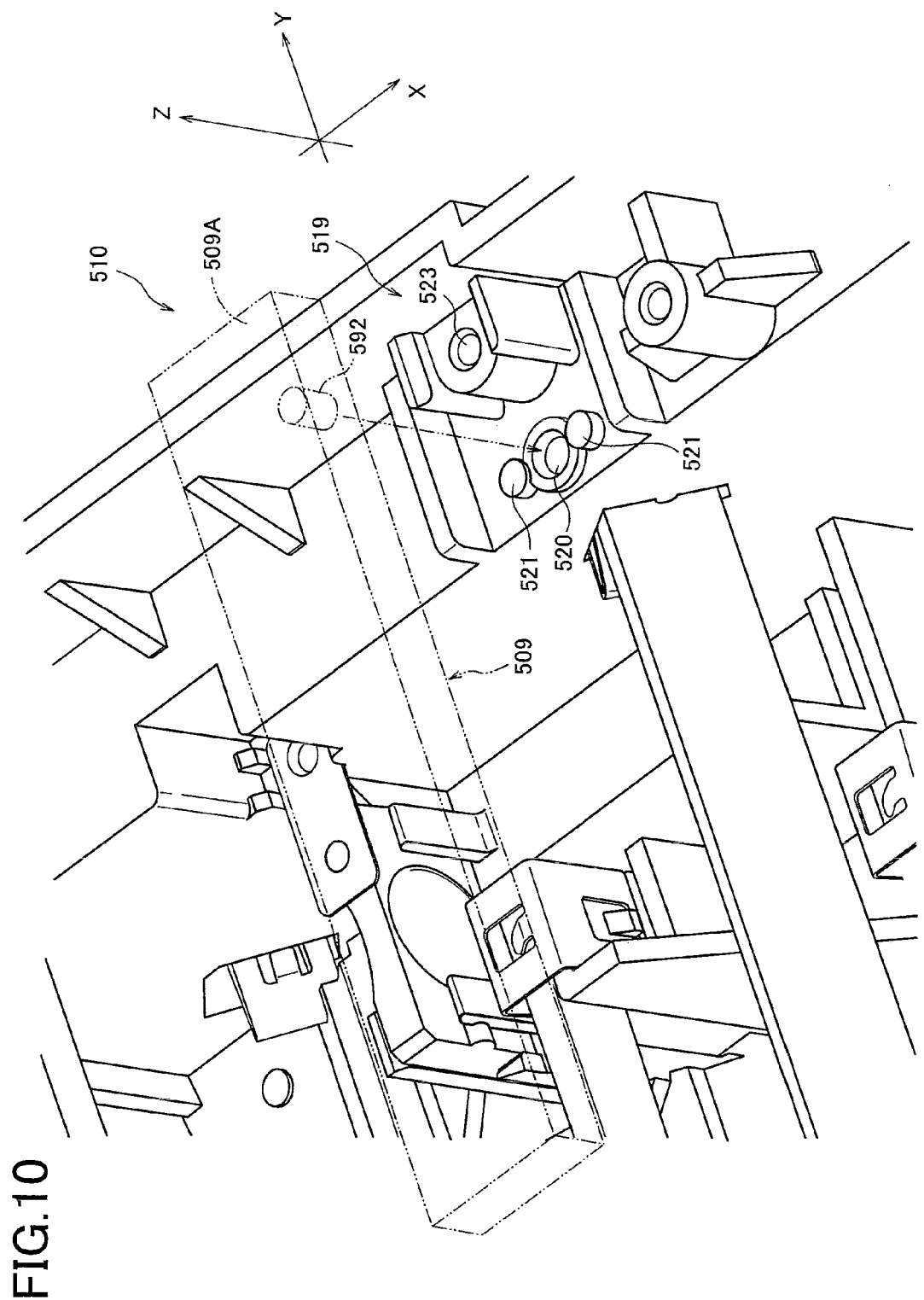
FIG. 10 is a perspective view of a second fθ lens attachment portion of the housing on the side corresponding to a first projection of the second fθ lens.
Figure 11:
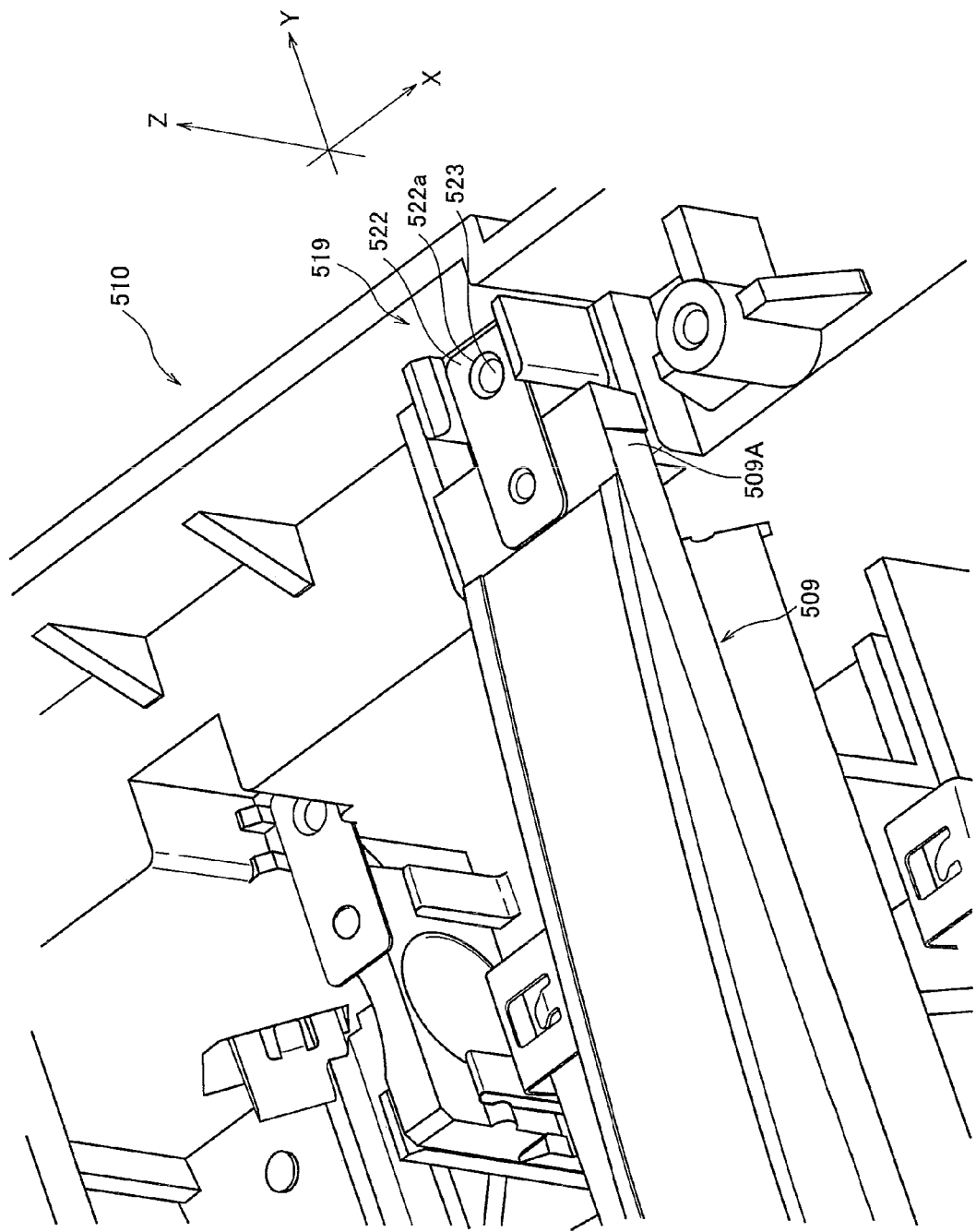
FIG. 11 is a perspective view of the second fθ lens attachment portion of the housing on the side corresponding to the first projection of the second fθ lens.
Figure 12:
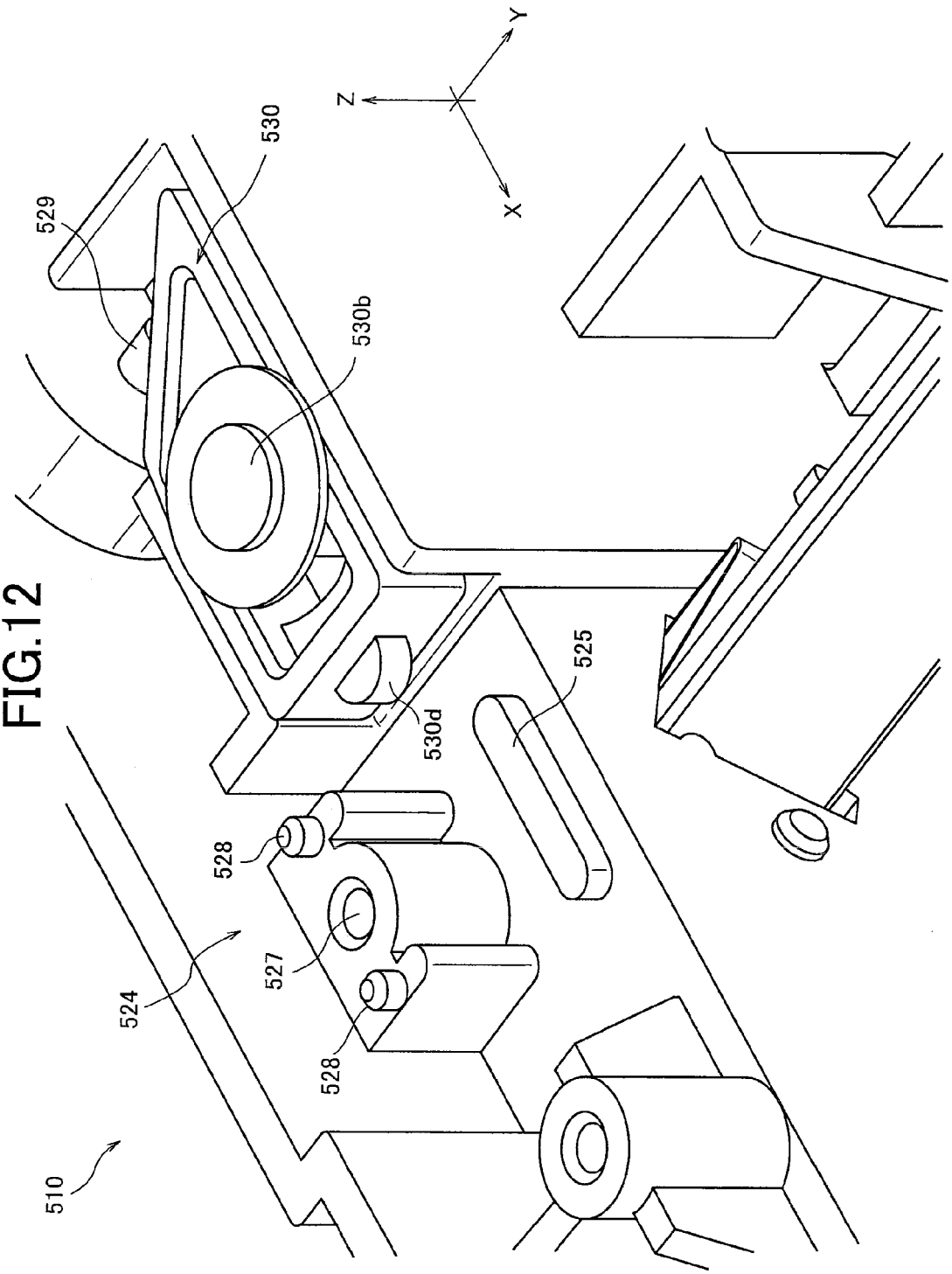
FIG. 12 is a perspective view of the second fθ lens attachment portion of the housing on the side corresponding to a gate portion of the second fθ lens.
Figure 13:
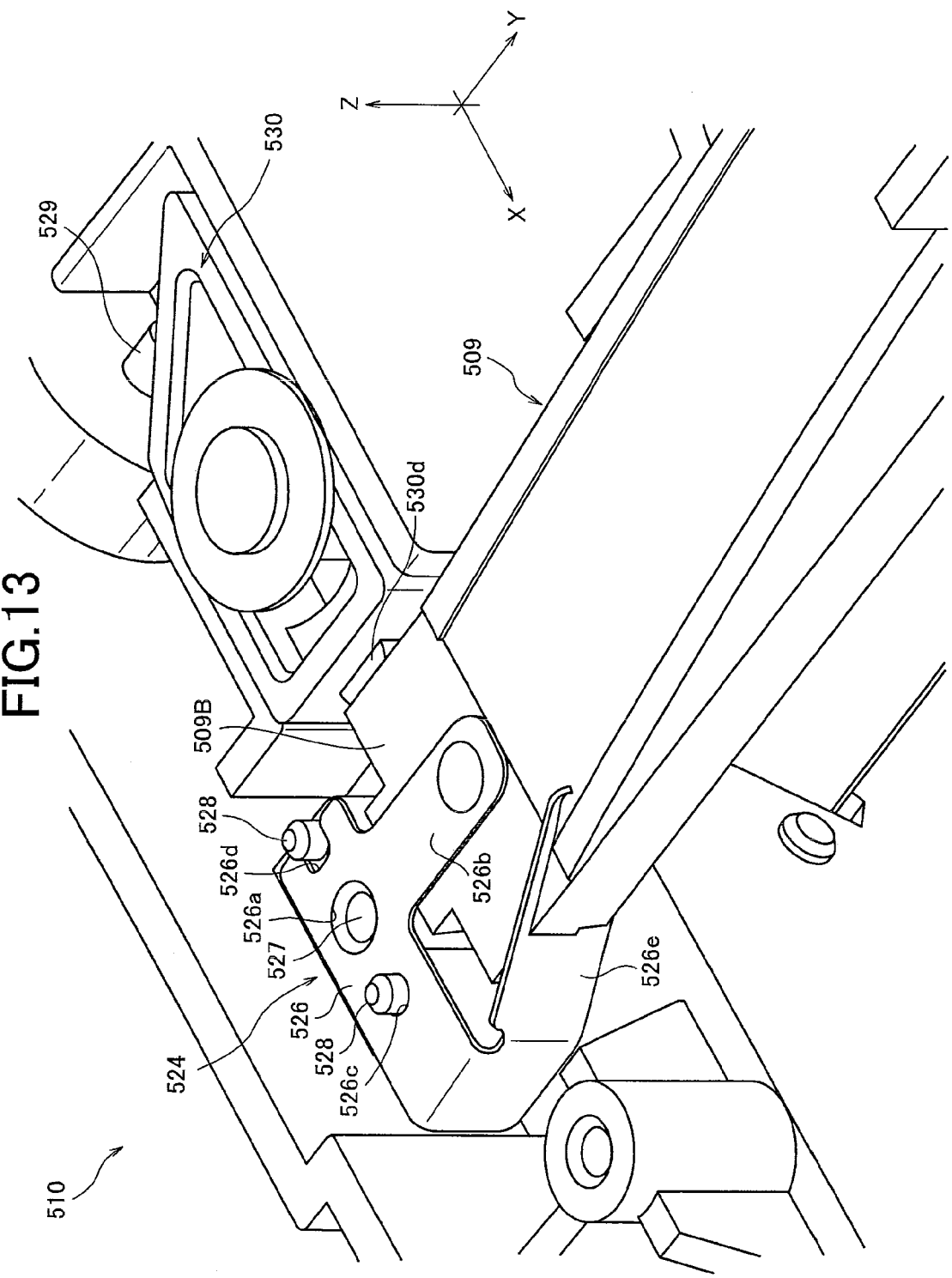
FIG. 13 is a perspective view of the second fθ lens attachment portion of the housing on the side corresponding to the gate portion of the second fθ lens.
Figure 14:
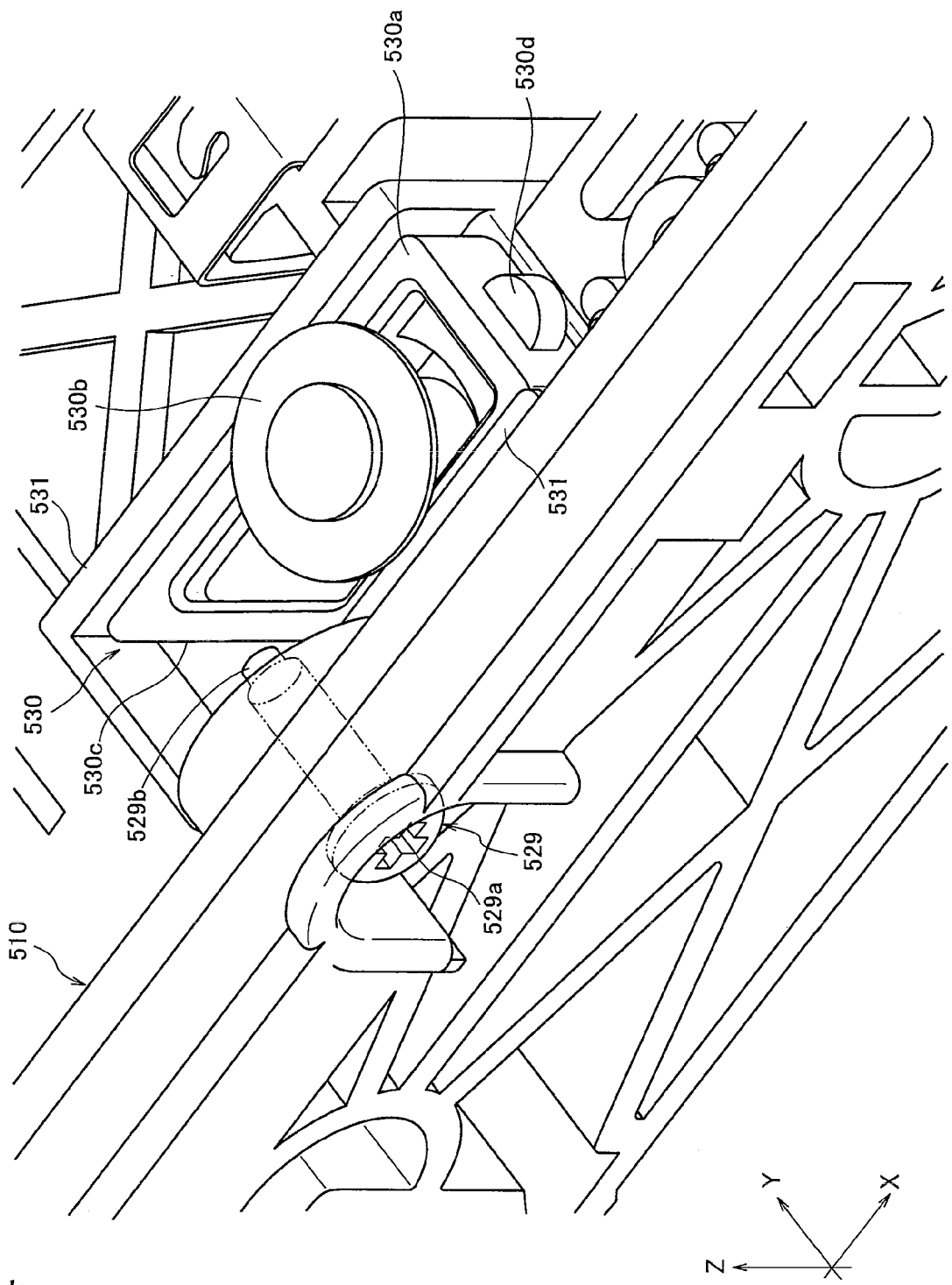
FIG. 14 is a diagram of a state around an adjustment screw of the housing before attaching the second fθ lens.
Figure 15A:
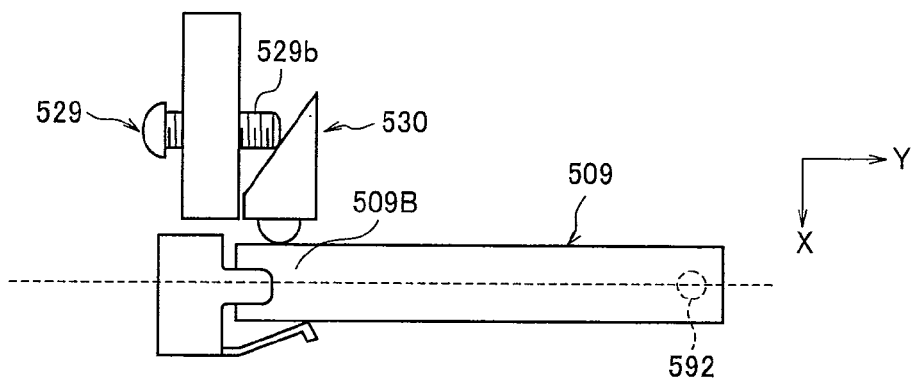
FIGS. 15A to 15C are explanatory diagrams of a moving mechanism for tilt adjustment of the second fθ lens.
Figure 15B:
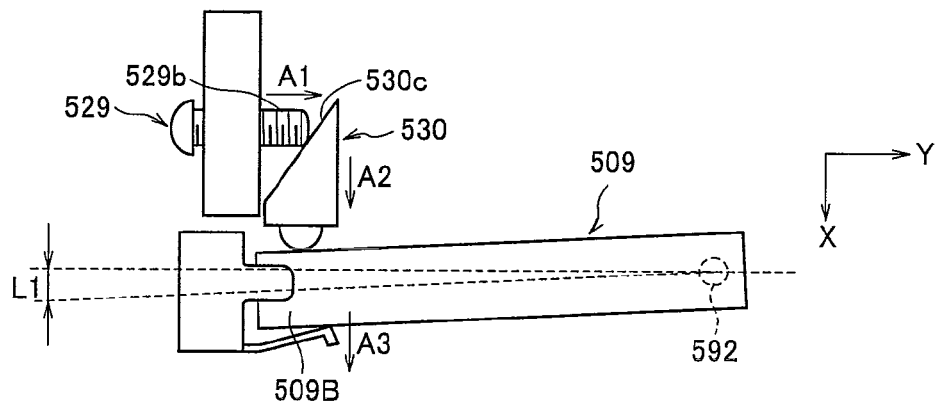
Figure 15C:
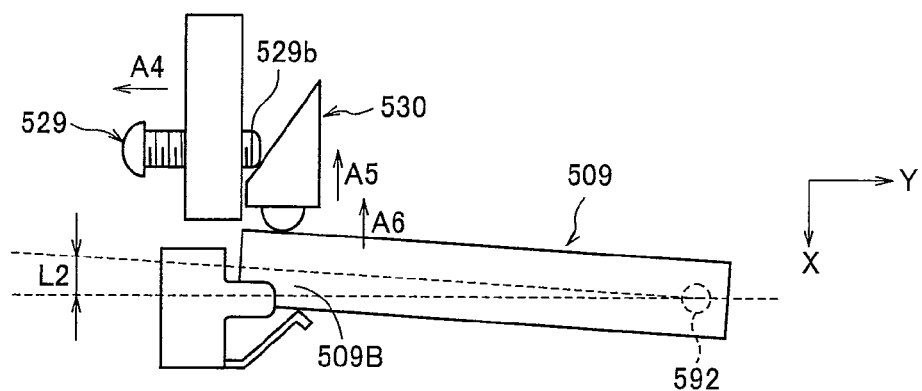

The housing equipped with the second fθ lens will be described with reference to FIGS. 10 to 15C. FIGS. 10 and 11 are perspective views of a second fθ lens attachment portion of the housing of FIG. 4 on the side corresponding to the first projection of the second fθ lens; FIG. 10 depicts a state before attaching the second fθ lens; and FIG. 11 depicts a state after attaching the second fθ lens. FIGS. 12 and 13 are perspective views of the second fθ lens attachment portion of the housing on the side corresponding to the gate portion of the second fθ lens; FIG. 12 depicts a state before attaching the second fθ lens; and FIG. 13 depicts a state after attaching the second fθ lens. FIG. 14 depicts a state around an adjustment screw described later of the housing before attaching the second fθ lens. FIGS. 15A to 15C explanatory diagrams of a moving mechanism for tilt adjustment of the second fθ lens.

The housing 510 is formed by the injection molding of a resin material, for example. As shown in FIG. 10, a side portion (first side portion) 519 of the housing 510 defined as an attachment portion of the first end 509A of the second fθ lens 509 includes a shaft hole 520 integrally formed and acting as a shaft support portion allowing insertion of the first projection 592 of the second fθ lens 509 to pivotally support the projection 592. This shaft hole 520 extends in the vertical direction (Z-direction) of the housing 510 and the second fθ lens 509 is attached from the upper direction such that the first projection 592 is inserted into the shaft hole 520.

The shaft hole 520 has, for example, a shape formed by boring in the shape of a cylinder having approximately the same diameter as the first projection 592 to pivotally support the first projection 592 of the second fθ lens 509. The diameter of this cylinder is 3 mm in this example and tolerance is +0.05 to 0. The tolerance of the first projection 592 of the second fθ lens 509 is −0.02 to −0.07.

The first side portion 519 of the housing 510 has two integrally formed first pedestal portions 521, each of which contacts with the two second projections 593 of the first end 509A of the second fθ lens 509, for the positioning of the second fθ lens 509 in the thickness direction (Z-direction). The first pedestal portions 521 are formed, for example, in a cylindrical shape and the upper surfaces thereof act as Z-direction reference surfaces for the first end 509A of the second fθ lens 509. The first pedestal portions 521 may be ground down on the metal mold to finely adjust the height thereof and to adjust the Z-direction position of the second fθ lens 509.

A plate spring 522 may be used as shown in FIG. 11 to prevent the first end 509A of the second fθ lens 509 from moving in the Z-direction and the first projection 592 from dropping off from the shaft hole 520 in the housing 510. In this case, the housing 510 is provided with a screw hole 523 for fixing the plate spring 522 and the plate spring 522 is disposed on the housing 510 with a hole 522a at one end of the plate spring 522 located on the screw hole 523 and the other end of the plate spring 522 located on the first end 509A of the second fθ lens 509. A bolt not shown is attached to the screw hole 523 and fixed to hold the first end 509A of the second fθ lens 509 through the use of the spring nature of the plate spring 522 and the first projection 592 may be prevented from dropping off in the Z-direction. Since the plate spring 522 resiliently hold the second fθ lens 509 in the Z-direction, the first projection 592 may be allowed to prevent the first projection 592 from rotating on the XY plane. The plate spring 522 is made of SUS material, etc.

To a side portion 524 defined as an attachment portion of the second end 509B of the second fθ lens 509 of the housing 510 (on the side of the gate portion 591 of the second fθ lens 509), as shown in FIG. 12, the second end 509B of the second fθ lens 509 is attached to be rotatable around the first projection 592. This side portion, i.e., the second side portion 524 opposite to the first side portion 519 in the Y-direction have a second pedestal portion 525 integrally formed and contacting with the one second projection 593 of the second end 509B of the second fθ lens 509 (see FIGS. 9A to 9E) for the positioning of the second fθ lens 509 in the thickness direction (Z-direction). The second pedestal portion 525 includes the upper surface acting as a Z-direction reference surface for the second end 509B of the second fθ lens 509. The second pedestal portion 525 may be ground down on the metal mold to finely adjust the height thereof and to adjust the Z-direction position of the second end 509B of the second fθ lens 509.

The second projection 593 of the second fθ lens 509 moves on the second pedestal portion 525 while rotating for the tilt adjustment of the second fθ lens 509. Since the second fθ lens 509 rotates with the first projection 592 pivotally supported in the shaft hole 520 of the housing 510, the second end 509B (the portion closer to the second pedestal 525) moves greater than the first end 509A. Correspondingly, the second pedestal 525 is formed in an oval shape.

A holding member 526 made of a resilient sheet metal material such as SUS is used as shown in FIG. 13 to prevent the second end 509B of the second fθ lens 509 from moving in the Z-direction. In this case, the housing 510 is provided with a screw hole 527 for fixing the holding member 526 and the holding member 526 is disposed such that a hole 526a provided in the holding member 526 is located on the screw hole 527. A holding portion 526b provided on the side opposite to the hole 526a is located on the second end 509B of the second fθ lens 509. A bolt not shown is attached to the screw hole 527 and fixes the holding member 526 to hold the second end 509B of the second fθ lens 509 through the use of the spring nature of the holding member 526 and the movement in the Z-direction may be prevented.

It is preferable to provide an engagement hole 526c and an engagement concave portion 526d in the holding member 526 and projections 528 engaging therewith on the housing 510 so as not to move the holding member 526 when the second fθ lens 509 rotates.

The second side portion 524 of the housing 510 is provided with a movement mechanism that moves the second end 509B of the second fθ lens 509 on a plane (XY plane) orthogonal to the thickness direction (Z-direction) (i.e., rotation that rotates the second end 509B). This mechanism is made up of an adjustment screw 529, a cam member 530, and a pressing (resilient) portion 526e integrally formed with the above holding member 526.

The adjustment screw 529 is turned around and inserted into the housing 510 with a head 529a exposed out of the housing 510 and the end of a shank 529b located within the housing 510 as shown in FIG. 14.

The cam member 530 is operated by the rotation of the adjustment screw 529 and is moved and applied against one side (surface) of the second end 509B of the second fθ lens 509.

The cam member 530 has a main body portion 530a guided by a guiding wall 531 of the housing 510 extending in the X-direction and moved with a contact segment for movement 530b provided on the main body 530a contacting the guiding wall 531 and, therefore, is movable only in the X-direction.

The cam member 530 also has a cam surface 530c consisting of an inclined surface provided on the main body portion 530a and contacting with the end of the shank 529b of the adjustment screw 529. Because of the cam surface 530c and the guiding wall 531, the cam member 530 is movable in the X-direction toward the second end 509B of the second fθ lens 509 when the adjustment screw 529 is tightened to be moved in the Y-direction toward the cam surface 530c (see FIG. 13).

The cam member 530 also has an operation segment 530d provided on the main body portion 530a on the side opposite to the inclined surface (cam surface) 530c in the X-direction and contacting with the second end 509B of the second fθ lens 509.

The pressing portion 526e of the holding member 526 contacts with the second end 509B of the second fθ lens 509 from the side opposite to the operation segment 530d of the cam member 530 as shown in FIG. 13 and applies a pressing force (bias force) to the second end 509B in the X-direction toward the cam member 530. This pressing force always acts on the second end 509B and, therefore, the second end 509B of the second fθ lens 509 presses the cam member 530 against the adjustment screw 529 in the X-direction.

In the movement mechanism made up of the adjustment screw 529, the cam member 530, and the pressing portion 526e, for example, when the adjustment screw 529 is rotated from the state of FIG. 15A and moved in the Y-direction toward the cam surface 530c (A1 direction of FIG. 15B), the cam member 530 is pushed out in the X-direction toward the second end 509B of the second fθ lens 509 (A2 direction) by the end of the shank 529b of the adjustment screw 529. As a result, the second end 509B of the second fθ lens 509 moves in the A3 direction against the pressing force of the pressing portion 526e and, since the first projection 592 is pivotally supported, the second fθ lens 509 is rotated around the first projection 592.

When the adjustment screw 529 is rotated from the state of FIG. 15A and moved in the Y-direction away from the cam surface 530c (A4 direction of FIG. 15C) in the movement mechanism, the second end 509B of the second fθ lens 509 pushes out the cam member 530 in the X-direction toward the contact end of the shank 529b of the adjustment screw 529 (A5 direction) and is pushed out in the X-direction toward the cam member 530 (A6 direction) due to the pressing force from the pressing portion 526e. Since the first projection 592 is pivotally supported, the second fθ lens 509 is rotated around the first projection 592.

The tilt adjustment width (L1, L2) of the second fθ lens 509 allowable in the movement mechanism is approximately 1.5 mm.

As above, the scanning line correction is easy in this optical scanning device since the second fθ lens 509 is rotatable around the first projection 592 provided at one end (the first end 509A) in the longitudinal direction of the second fθ lens 509 and only the second end side may be adjusted at the time of tilt adjustment of the second fθ lens 509.

Figure 16A:
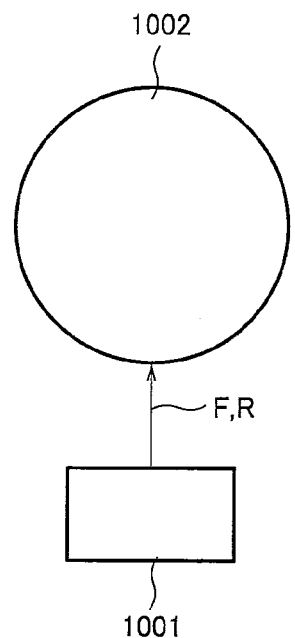
FIGS. 16A to 16B are explanatory diagrams of the case that a lens requires rotation adjustment.
Figure 16B:
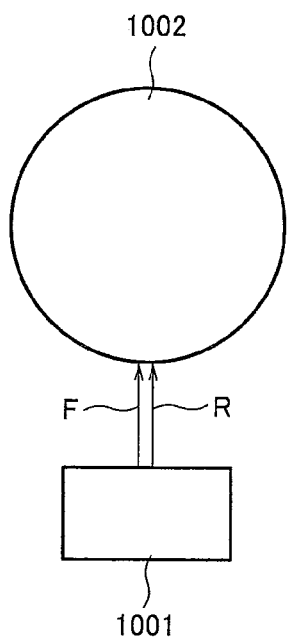

The optical scanning device is preferably used in a color image forming apparatus. If the tilt adjustment is not performed the color image forming apparatus, even when one color has a tilted optical scanning line as shown in FIG. 16B, the formation position is shifted for the color, resulting in a color shift or color irregularity at the time of image formation. Using the optical scanning device in the color image forming apparatus prevents the image quality deterioration such as color irregularity due to the displacement of each color.

According to the present invention, the following effect may be acquired.

The optical scanning device of the present invention enables the lenses to be easily attached to the housing and the tilt adjustment of the imaging lens to be easily performed without using positioning jig, etc. Since the fluidity of the molding resin is not disturbed when forming the lens with an an injection molding apparatus, the occurrence of distortion and warpage of the lens may be prevented. Therefore, when the optical scanning device is applied to the image forming apparatus, the occurrence of the image quality deterioration such as image distortion may be prevented.

The invention claimed is:

1. An optical scanning device scanning a photoreceptor with a light beam from a light source through at least lenses, the lenses including a long lens elongated in the main scanning direction for the photoreceptor, at least one of the lenses including support ends formed at both ends of and outside of the lens effective area in the longitudinal direction of the lens, one of the support ends formed at both the ends including a first projection that projects from a side surface in the incoming or outgoing direction of the beam for the lens, the first projection positioning the lens in the longitudinal direction relative to a housing supporting the lens, wherein the housing has a pair of concave places retaining both the ends of the lens and facing each other, wherein the concave places has upper opening portions allowing the support ends of the lens to be inserted, lateral opening portions opposed to each other to receive the support ends of the inserted lens, and one of opposed side walls forming the concave places with a groove engaging with the first projection, and wherein the lens is inserted from the upper opening portions of the concave places and positioned and equipped in the longitudinal direction of the lens relative to the housing with the first projection engaged in the groove.

2. The optical scanning device as defined in claim 1, wherein the lens has a second projection shorter than the first projection on a side surface provided with the first projection of the support ends at both the ends and is positioned and equipped in the incoming or outgoing direction of the beam for the lens relative to the housing when the second projection contacts with one of the opposed side walls forming the concave places.

3. The optical scanning device as defined in claim 2, wherein a plurality of second projections are provided, one on the support end provided with the first projection in front of the first projection in the lens insertion direction and two on the support end opposite to the support end provided with the first projection in an arrangement along the lens insertion direction.

4. The optical scanning device as defined in claim 1, wherein the support ends at both the ends of the lens are inserted into the concave places and wherein the support end provided with the first projection is bonded and fixed at the bottom to the bottom of the concave place.

5. The optical scanning device as defined in claim 1, wherein the lens is injection-molded with the use of a metal mold provided with a gate correspondingly to the support end opposite to the support end provided with the first projection.

6. The optical scanning device as defined in claim 1, wherein the first projection has a cylindrical shape.

7. The optical scanning device as defined in claim 1, wherein the concave places are integrally formed in the housing.

8. An image forming apparatus comprising the optical scanning device as defined in any one of claims 1 to 7.

9. An optical scanning device scanning a photoreceptor with a light beam from a light source through at least lenses, the lenses including a long lens elongated in the main scanning direction for the photoreceptor, at least one of the lenses including support ends formed at both ends of outside of the lens effective area in the longitudinal direction of the lens, one of the support ends formed at both the ends including a first projection projecting from a side surface in the incoming or outgoing direction of the beam for the lens and acting as a rotation axis of the lens, a housing supporting the lens, including attachment portions on both sides for the support ends at both the ends of the lens, the attachment portion on one side having a shaft support portion allowing the first projection of the lens to be inserted to pivotally support the projection, the support end opposite to the side provided with the first projection of the lens being attached rotatably around the first projection to the attachment portion on the other side of the housing.

10. The optical scanning device as defined in claim 9, wherein the housing includes a rotation mechanism causing the support end on the opposite side of the lens to rotate, wherein the rotation mechanism has an adjustment screw turned around and inserted into the housing, a cam member operated by the rotation of the adjustment screw to move in contact with one side of the support end on the opposite side of the lens, and a resilient member that presses the other side of the support end on the opposite side of the lens, and wherein the lens is attached with the support end on the opposite side of the lens allowed to rotate due to the rotation of the adjustment screw.

11. The optical scanning device as defined in claim 9, wherein the lens has a second projection shorter than the first projection on a side surface provided with the first projection of the support ends at both the ends and is positioned in the incoming or outgoing direction of the beam for the lens relative to the housing when the second projection contacts with the bottom of the lens attachment portion.

12. The optical scanning device as defined in claim 11, wherein a plurality of second projections are provided, two on the support end provided with the first projection and one on the support end of the opposite side.

13. The optical scanning device as defined in claim 9, wherein the lens is injection-molded with the use of a metal mold provided with a gate correspondingly to the opposite support end of the lens.

14. An image forming apparatus comprising the optical scanning device as defined in any one of claims 9 to 13.

15. The image forming apparatus of claim 14, wherein the image forming apparatus has a color image forming function and the lens for each color within the housing.

* * * * *